United States Patent
White et al.

(10) Patent No.: US 11,814,932 B2
(45) Date of Patent: *Nov. 14, 2023

(54) METHOD OF ATTENUATING ANNULAR PRESSURE BUILDUP USING COMPRESSIBLE PARTICLES

(71) Applicant: ExxonMobil Technology and Engineering Company, Spring, TX (US)

(72) Inventors: Spencer A. White, Houston, TX (US); Thomas A. Petersen, Houston, TX (US); Elizabeth L. Templeton-Barrett, Houston, TX (US); Sabine C. Zeilinger, Spring, TX (US); Catalin D. Ivan, West University Place, TX (US); Peter A. Gordon, Yardley, PA (US); Christian S. Mayer, Flemington, NJ (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/221,132

(22) Filed: Apr. 2, 2021

(65) Prior Publication Data
US 2021/0310335 A1    Oct. 7, 2021

Related U.S. Application Data

(60) Provisional application No. 63/108,035, filed on Oct. 30, 2020, provisional application No. 63/006,577, filed on Apr. 7, 2020.

(51) Int. Cl.
*E21B 33/122* (2006.01)
*E21B 41/00* (2006.01)
(Continued)

(52) U.S. Cl.
CPC ........ *E21B 41/0021* (2013.01); *E21B 33/122* (2013.01); *F16F 9/006* (2013.01);
(Continued)

(58) Field of Classification Search
CPC .. E21B 41/0021; E21B 33/122; E21B 33/124; E21B 33/126; E21B 33/1243; E21B 41/00; E21B 41/007
See application file for complete search history.

(56) References Cited

U.S. PATENT DOCUMENTS 3,120,272 A * 2/1964 Cochran ............... E21B 33/129
277/342
4,109,725 A * 8/1978 Williamson .......... E21B 49/001
166/321
(Continued)

FOREIGN PATENT DOCUMENTS

EP        3087154 B1 *  7/2019  ............. C01B 32/00

OTHER PUBLICATIONS

Kujong Jung, "Internal Burning Of Petroleum Coke Particles In A Fluidized Bed", Fuel, Jun. 1987, pp. 774-778, vol. 66.
Eric M. Suuberg et al., "Elastic Behaviour Of Coals Studied By Mercury Porosimetry", Fuel, Jan. 13, 1995, pp. 1522-1530, vol. 74 No. 10.

*Primary Examiner* — Angela M DiTrani Leff
(74) *Attorney, Agent, or Firm* — ExxonMobil Technology and Engineering Company—Law Department

(57) ABSTRACT

A method of attenuating annular pressure buildup within a wellbore. The method includes accessing a wellbore, with the wellbore having an annulus disposed between first and second strings of casing. The method also includes placing a column of cement around the second string of casing generally below the first string of casing. The method further includes pumping a fluid mixture into the annulus, forming a fluid column. The fluid mixture comprises a carrier fluid, and a plurality of compressible particles dispersed in the
(Continued)

carrier fluid. Each of the compressible particles is fabricated to partially collapse in response to thermal expansion of the fluid mixture. The method also includes placing a wellhead over the wellbore, thereby forming a trapped annulus in the wellbore. The method additionally includes at least partially sealing the annular region along at least one depth above the column of cement to inhibit vertical migration of the compressible particles.

24 Claims, 20 Drawing Sheets

(51) Int. Cl.
    *F16F 9/00*     (2006.01)
    *F16L 57/02*     (2006.01)
(52) U.S. Cl.
    CPC ........... *F16L 57/02* (2013.01); *F16F 2222/02* (2013.01); *F16F 2224/005* (2013.01); *F16F 2228/007* (2013.01); *F16F 2230/0023* (2013.01)

(56) References Cited

U.S. PATENT DOCUMENTS

| | | | |
|---|---|---|---|
| 7,096,944 B2 * | 8/2006 | Vargo, Jr. | E21B 33/13 166/250.14 |
| 8,100,179 B2 * | 1/2012 | Hermes | E21B 33/13 166/371 |
| 8,360,151 B2 * | 1/2013 | Williams | C04B 26/04 507/903 |
| 11,359,129 B2 * | 6/2022 | Narhi | E21B 21/00 |
| 11,401,459 B2 * | 8/2022 | Narhi | C09K 8/805 |
| 2007/0114033 A1 * | 5/2007 | Hermes | C09K 8/42 166/371 |
| 2010/0113310 A1 * | 5/2010 | Shepherd | E21B 41/00 507/219 |
| 2018/0291251 A1 * | 10/2018 | Gamwell | C09K 8/40 |
| 2020/0148932 A1 | 5/2020 | Narhi et al. | |
| 2020/0148933 A1 | 5/2020 | Kibey et al. | |
| 2020/0148936 A1 | 5/2020 | Narhi et al. | |
| 2020/0148945 A1 | 5/2020 | Narhi et al. | |
| 2020/0149374 A1 | 5/2020 | Narhi et al. | |
| 2021/0230969 A1 * | 7/2021 | Xiao | E21B 41/00 |

* cited by examiner

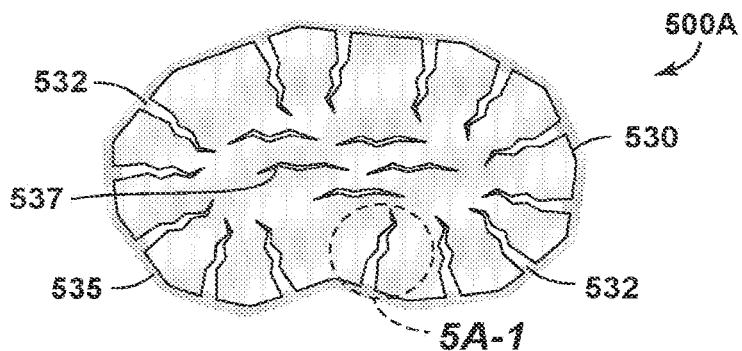
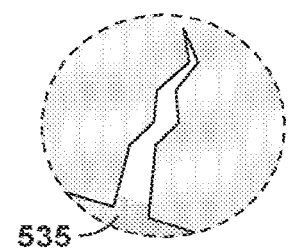
FIG. 5A　　　　　　FIG. 5A-1
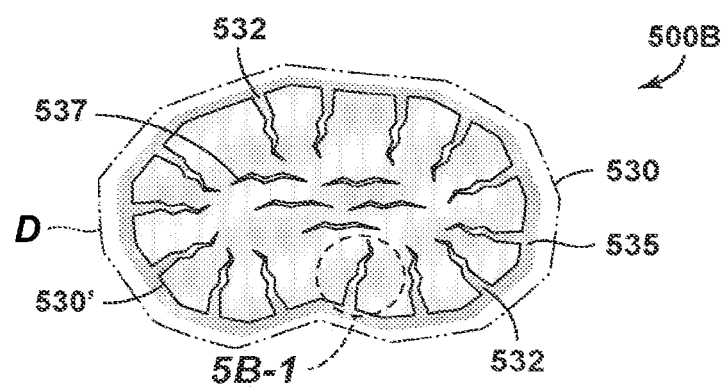
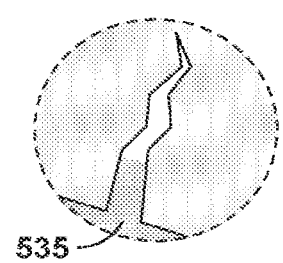
FIG. 5B　　　　　　FIG. 5B-1

US 11,814,932 B2

METHOD OF ATTENUATING ANNULAR PRESSURE BUILDUP USING COMPRESSIBLE PARTICLES

CROSS REFERENCE TO RELATED APPLICATION

This application claims the benefit of U.S. Provisional Application No. 63/006,577 filed Apr. 7, 2020 entitled "METHOD OF PLACING AND/OR SUSPENDING COMPRESSIBLE PARTICLES IN A WELLBORE." This application claims the benefit of U.S. Provisional Application No. 63/108,035 filed Oct. 30, 2020 entitled "METHOD OF ATTENUATING ANNULAR PRESSURE BUILDUP USING COMPRESSIBLE PARTICLES." Each of these applications is incorporated herein by reference in its entirety.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present disclosure relates to the field of hydrocarbon recovery operations. More specifically, the present invention relates to the drilling and completion of wells. Further, the invention relates to a method of placing compressible particles into a confined annular region within a wellbore in order to absorb pressure in response to thermal fluid expansion occurring during production.

Technology in the Field of the Invention

In the drilling of oil and gas wells, a wellbore is formed using a drill bit that is urged downwardly at a lower end of a drill string. The drill bit is rotated while force is applied through the drill string and against the rock face of the formation being drilled. After drilling to a predetermined depth, the drill string and bit are removed and the wellbore is lined with a string of casing.

In completing a wellbore, it is common for the drilling company to place a series of casing strings having progressively smaller outer diameters into the wellbore. A first string of casing is placed from the surface and down to a first drilled depth. This casing is known as surface casing. In the case of offshore operations, this casing may be referred to as a conductor pipe. One of the main functions of the initial string of casing is to isolate and protect the shallower, fresh water bearing aquifers from contamination by wellbore fluids. Accordingly, this casing string is almost always cemented entirely back to the surface.

One or more intermediate strings of casing is also run into the wellbore. Each successive pipe string extends to a greater depth than its predecessor, and has a smaller diameter than its predecessor. The process of drilling and then cementing progressively strings of casing is repeated several times until the well has reached total depth.

A final string of casing, referred to as production casing, is used along the pay zones. In some instances, the final string of casing is a liner, that is, a pipe string that is hung in the wellbore using a liner hanger. Frequently today, the final string of casing is a long pipe string that extends along a horizontal portion (or "leg") of a wellbore.

In most completion operations today, especially those involving so called unconventional formations where high-pressure hydraulic operations are conducted downhole, the surface casing and perhaps the first intermediate string of casing are entirely cemented up to the surface. However, in some completions, particularly those where overlapping strings of casing extend to the surface, the operator may choose to leave an extended portion of certain intermediate casing strings without cement. This saves the drilling company time and the well operator money. However, this also means that upon completion an extended section of wellbore will have fluids residing on top of a column of cement up to the well head.

FIG. 1A is a cross-sectional view of a wellbore 100 undergoing completion. The wellbore 100 defines a bore 102 that has been drilled from a surface 105 of the Earth into a subsurface 110. The wellbore 100 is formed using any known drilling mechanism, but preferably using a land-based rig or an offshore drilling rig on a platform. For deeper horizontal wells such as the one shown in FIG. 1A, the wellbore may be formed at least in part through the use of a downhole motor, measurement-while-drilling ("MWD") electronics, and/or rotary-steerable drilling assemblies.

The wellbore 100 is completed with a first string of casing 120, sometimes referred to as surface casing. The wellbore 100 is further completed with a second string of casing 130, typically referred to as an intermediate casing. In deeper wells, that is wells completed below 7,500 feet, as an example, at least two intermediate strings of casing are typically used. In FIG. 1A, a second intermediate string of casing 140 is also shown.

The wellbore 100 is finally completed with a string of production casing 150. In the view of FIG. 1A, the production casing extends from the surface 105 down to a subsurface formation, or "pay zone" 115. The wellbore 100 is completed horizontally, meaning that a horizontal "leg" 50 is provided. The leg 50 includes a heel 153 and a toe 154 along the pay zone 115. In this instance, the toe 154 defines the end (or "TD") of the wellbore 100.

It is observed that the annular region around the surface casing 120 is filled with cement 125. The cement (or cement matrix) 125 serves to isolate the wellbore from fresh water zones and potentially porous formations around the casing string 120 and near the surface 105.

The annular regions 132, 142 around the intermediate casing strings 130, 140 are also filled with cement 135, 145. Similarly, an annular region 152 around the production casing 150 is filled with cement 155. However, the cement 135, 145, 155 is only placed behind the respective casing strings 130, 140, 150 up to the lowest joint of the immediately surrounding casing string, or cement shoe. Thus, a non-cemented annular area is preserved above the cement (or cement matrix) 135; a non-cemented annular area is preserved above the cement (or cement matrix) 145; and a non-cemented annular area is preserved above the cement matrix 155.

FIG. 1B is an enlarged perspective view of the wellbore 100 of FIG. 1A, or at least the upper half of the wellbore 100. Here, casing strings 120, 130, 140 and 150 are again shown. In addition, cement matrices 125, 135, 145 and 155 are visible. Finally, non-cemented portions of annular regions 132, 142 and 152 are shown.

An annulus can be considered "trapped" if the cement pumping places the top of cement (or "TOC") higher than the previous shoe. Alternately, if the shoe remains open to the formation (not blocked by the cement), drilling mud particles or formation fines may settle out, effectively plugging up the bottom of the annulus. In any instance, those of ordinary skill in the art will understand that the non-cemented portions of annular regions 132, 142, 152 are not unfilled above the TOC; rather, they are left with wellbore fluids therein. Such fluids may include drilling fluids, aqueous acid, and formation gas. When the well is completed, a wellhead (not shown) is placed over the annular regions 132, 142, 152, sealing these regions. For this reason each may be referred to as a "trapped annulus."

During the course of producing hydrocarbons, warm production fluids flow through a tubing string 160 up to the surface 105. These fluids raise the temperature inside the wellbore 100, including the fluids inside the one or more trapped annuli of the annular regions 132, 142, 152, causing thermal expansion. This, in turn, increases the pressure within each trapped annulus. (Note that the effect of a trapped annulus is that the fluid in the annulus has no path to escape as the pressure rises.) This pressure can exceed the pressure ratings (burst or collapse pressures) of the inner strings of casing.

Accordingly, a need exists for an improved wellbore design that can absorb burst or collapse pressure and mitigate thermal expansion within annular regions as wellbore temperature increases. Further, a need exists for a unique carrier fluid mixture having compressible/collapsible particles capable of absorbing an increase in fluid pressure within a trapped annulus. A need further exists for a method of attenuating annular pressure buildup using compressible particles placed along a trapped annulus along with annular sealing devices that at least partially restrict vertical movement of the particles.

BRIEF SUMMARY OF THE DISCLOSURE

A method of attenuating annular pressure buildup in a wellbore is provided herein. In one aspect, the method first comprises accessing a wellbore. The wellbore includes a first string of casing, and then a second string of casing. The first string of casing extends into a subsurface to a first depth, while the second string of casing extends into the subsurface to a second depth that is greater than the first depth. The first string of casing surrounds an upper portion of the second string of casing, forming an annular region.

The method also includes pumping a column of cement into the annular region. This may be done by pumping a cement slurry down the second string of casing and into a wellbore annulus behind the fluid mixture. The column of cement is then allowed to set around the second string of casing below the first depth.

The method also includes pumping a fluid mixture into the annular region. This may involve pumping the fluid mixture down the second string of casing and then back up the annulus. This is typically done ahead of the column of cement being placed in the annulus. Alternatively, this may involve pumping the fluid mixture down the annulus, through a reverse-circulation sleeve in the casing, and back up the second string of casing. This is typically done after the column of cement has already been placed in the wellbore and has set.

In either instance, a fluid column is formed in the annular region over a column of cement. The fluid column comprises a fluid mixture having a carrier fluid. The carrier fluid may be, for example, brine. Alternatively, the carrier fluid may be an aqueous or non-aqueous drilling fluid. In that instance, the carrier fluid comprises weighting agent particles as part of the drilling fluid. Alternatively, the carrier fluid may be a thixotropic fluid.

The fluid mixture also includes a plurality of compressible particles. Each of the compressible particles is fabricated to partially collapse in response to thermal expansion of fluid within the annular region. This typically occurs after the production of hydrocarbon fluids up the wellbore has begun. Preferably, each of the compressible particles comprises carbon fibers or carbon particles. Preferably, each of the particles is coated with a polymeric rubber material.

In one aspect, the carrier medium is a drilling fluid, and the particles making up the weighting agent have a diameter that is substantially similar to a diameter of the compressible particles. The similar particle sizes increase settled permeability, and potentially provide a favorable settled configuration within the annulus. In another aspect, the weighting agent particles each have a particle size that is approximately 150 times, or even 200 times, smaller than a size of the carbonaceous particles. Some variation in weighting agent size may be applied.

The method may also include placing a wellhead over the wellbore. In this way, a trapped annulus is formed in the wellbore. Of interest, the fluid mixture resides within the trapped annulus.

In one aspect, the method further includes at least partially sealing the annular region along at least one depth above the column of cement. At least partially sealing the annular region along the annular region may comprise placing at least two packers in series along the second string of casing, and then actuating each of the at least two packers. Preferably, actuating each of the at least two packers operates to completely seal off the annular region.

In another aspect, at least partially sealing the annular region above the column of cement comprises securing at least two sealing joints in series along the second string of casing. Here, each of the at least two sealing joints comprises concave cups. The cups may be upwardly concave, downwardly concave, or combinations thereof. The cups are oriented to restrict upward floating or downward settling of the compressible particles along the trapped annulus.

Concerning the compressible particles, the compressible particles together preferably have a reversible volumetric contraction of greater than or equal to (≥) 3% when subjected to a hydrostatic fluid pressure that increases from atmospheric pressure, 15 pounds per square inch ("psi"), to 6,000 psi or at pressures of at least 6,000 psi. In one aspect, the plurality of particles together have a reversible volumetric contraction of ≥3% when subjected to a hydrostatic fluid pressure that increases from atmospheric pressure, 15 pounds per square inch ("psi"), to 10,000 psi or at pressures up to 10,000 psi.

A specific gravity of each of the compressible particles may be within plus/minus 0.2 of a specific gravity of the carrier fluid. Preferably, the carrier fluid is an aqueous fluid, and each of the compressible particles has a density that is 1.5 to 2.0 times that of the carrier fluid.

In one aspect, a density of a majority of each of the compressible particles is less than a density of the carrier fluid such that the compressible particles are biased to rise in the trapped annulus towards the packers. Alternatively, a density of a majority of each of the compressible particles is greater than a density of the carrier fluid such that the compressible particles are biased to sink in the trapped annulus towards the packers. More preferably, compressible particles having slightly different densities are employed to further ensure disbursement of the particles along a length of the trapped annulus.

The method may further comprise blending the compressible particles into the carrier fluid at a surface to form the fluid mixture. This is done, of course, before pumping the fluid mixture into the annulus. In addition, the method may comprise producing hydrocarbon fluids from the wellbore. The hydrocarbon fluids are produced from a warm subsurface formation. The process of bringing the hydrocarbon fluids to the surface warms the fluid column in the trapped annulus, causing the thermal expansion. Beneficially, the compressible particles are designed to absorb this thermal expansion.

A method of placing compressible particles within a wellbore is also provided herein. The compressible particles are used to attenuate pressure within a trapped annulus after a well has been placed on-line for production.

In one embodiment, the method first includes running a first string of casing into a wellbore. The first string of casing extends into a subsurface to a first depth. The method also includes running a second string of casing into the wellbore. The second string of casing extends into the subsurface to a depth that is greater than the first depth. The first string of casing surrounds an upper portion of the second string of casing forming an annular region.

The method also includes pumping a fluid mixture into the annular region. This may involve pumping the fluid mixture down the second string of casing and then back up the annulus. This is typically done ahead of a column of cement being placed in the annulus. Alternatively, this may involve pumping the fluid mixture down the annulus, through a reverse-circulation sleeve in the drill pipe, and back up the second string of casing. This is typically done after the column of cement has already been placed in the wellbore and has set.

In either instance, a fluid column is formed over a column of cement in the annular region. The fluid mixture in the fluid column comprises a carrier fluid. The carrier fluid may be brine. Alternatively, the carrier fluid may be an aqueous drilling fluid. In that instance, the carrier fluid may comprise weighting agent particles as part of the drilling fluid.

The method may also include placing a wellhead over the wellbore. In this way, a trapped annulus is formed in the wellbore. Of interest, the fluid mixture resides within the trapped annulus.

The fluid mixture is in accordance with the fluid mixture described above in any of its embodiments. In this method, the compressible particles comprise a plurality of carbonaceous particles. This may be in the form of carbon fibers or carbon particles. The carbonaceous particles are designed to absorb pressure in response to thermal expansion of wellbore fluids within the annular region during the production of hydrocarbon fluids from the wellbore. The carbonaceous particles may be at a concentration of 5% to 40% of the fluid mixture, by volume.

Preferably, each of the plurality of compressible particles has a reversible volumetric expansion/contraction of ≥3% at pressures between 15 psi and at least 6,000 psi or when subjected to a hydrostatic fluid pressure between atmospheric pressure (15 psi) to 6,000 psi or at pressures of at least 6,000 psi. In one aspect, the carbonaceous particles are designed to have an optimum pressure performance at an upper end of the range of expected pressures during production. For example, the plurality of particles together may have a reversible volumetric expansion/contraction of ≥10% and even up to 25% at pressures up to 10,000 psi or for pressure changes between 15 psi and at least 10,000 psi or when subjected to changes in a hydrostatic fluid pressure between atmospheric pressure (15 psi) to 10,000 psi.

Ideally, a specific gravity of each of the compressible particles is within plus-or-minus 0.2 of a specific gravity of the carrier fluid. In one aspect, each of the compressible particles has a specific gravity that is 1.5 to 2.0 times that of the carrier fluid. In one aspect, each of the compressible particles has a density of between 12.5 pounds per gallon ("ppg") and 15.5 ppg, inclusive. Of course, it is understood that as pressure increases, the density of the particles also increases.

The carrier medium is preferably a drilling fluid that comprises a weighting agent. The compressible particles come into contact with the weighting agent particles during a step of blending the fluid mixture at the surface. In one aspect, the method further comprises designing a density of at least a portion of the compressible particles to provide buoyancy within the carrier fluid when the compressible particles come into contact with the weighting agent particles.

Each of the compressible particles is fabricated to collapse in response to fluid pressure within the annular region. In one aspect, each of the particles comprises peripheral openings, permitting an ingress of wellbore fluids in response to an increase in pressure within the confined wellbore volume. Stated another way, each of the particles comprises pore spaces that are open to an outer surface of each particle, allowing fluid intrusion directly into the particles once pressure begins to rise. Alternatively, each of the particles has a polymeric rubber coating applied to the particles during fabrication, preventing an ingress of fluids into the particles during thermal expansion.

The method may further include at least partially sealing the annular region along at least one depth above the column of cement. In one aspect, at least partially sealing the annular region along above the column of cement comprises placing at least two packers in series along the second string of casing, and then actuating each of the at least two packers. Preferably, actuating each of the at least two packers operates to completely seal off the annular region.

In another aspect, at least partially sealing the annular region above the column of cement comprises securing at least two sealing joints in series along the second string of casing. Here, each of the at least two sealing joints comprises concave cups. The cups may be upwardly concave, downwardly concave, or combinations thereof. The cups are oriented to restrict upward floating or downward settling of the compressible particles along the trapped annulus.

The method may also comprise producing hydrocarbon fluids from the wellbore. The hydrocarbon fluids are produced from a warm subsurface formation. The process of bringing the hydrocarbon fluids to the surface warms the fluid column in the trapped annulus, causing the thermal expansion. Beneficially, the compressible particles are designed to absorb this thermal expansion.

In one embodiment, the compressible particles comprise first compressible particles having a first degree of compressibility, and second compressible particles having a second degree of compressibility. The first degree of compressibility is higher than the second degree of compressibility. In another embodiment, the compressible particles comprise first compressible particles having a first selected density, and second compressible particles having a second selected density. The first density is greater than the second density.

Finally, a wellbore having a trapped annulus is provided. The wellbore includes a first string of casing, and then a second string of casing. The first string of casing extends into a subsurface to a first depth, while the second string of casing extends into the subsurface to a second depth that is greater than the first depth. The first string of casing surrounds an upper portion of the second string of casing, forming an annular region.

The wellbore also includes a column of cement. The column of cement resides around the second string of casing below the first depth. A wellhead is placed over the wellbore. This forms a trapped annulus in the wellbore over the annular region.

At least one mechanism is placed in series along the second string of casing. The barrier mechanisms, or mechanical barriers, are configured to a least partially seal the annular region along the column of cement.

The wellbore also comprises a fluid mixture. The fluid mixture resides within the trapped annulus. The fluid mixture comprises a carrier fluid, and a plurality of compressible, carbonaceous particles dispersed in the carrier fluid. The plurality of compressible particles together have a compressibility response (or "reversible volumetric expansion/contraction") of ≥3% at pressure changes of at least 6,000 psi or for pressure changes between 15 psi and at least 6,000 psi or when subjected to a change in hydrostatic fluid pressure between atmospheric pressure (15 psi) to 6,000 psi. The carbonaceous particles are designed to absorb pressure in response to thermal expansion of wellbore fluids within the annular region during the production of hydrocarbon fluids from the wellbore.

Preferably, the wellbore comprises at least two mechanical barriers placed within the annulus before the fluid mixture is pumped into the annulus. Each mechanical barrier is configured to restrict gravitational settling, or alternatively buoyant rising, of the compressible particles along the fluid column. In one aspect, the at least two mechanical barriers comprise packers. The packers are actuated to create the seal after the fluid mixture is pumped into the annular region.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications. In the Detailed Description which follows, the terms "Figure" and "FIG." may be used interchangeably and the terms "Figures" and "FIGS." may be used interchangeably.

FIG. 5A is a cross-sectional view of a compressible particle that may be placed in the annuli of FIGS. 3A, 3B, 3C, 4A, 4B and 4C, in one embodiment. Here, the particle represents a solid material having a plurality of peripheral openings. The particle is at ambient conditions.

FIG. 5A-1 is an exploded view of one of the outer openings in the compressible particle of FIG. 5A.

FIG. 5B is another cross-sectional view of the particle of FIG. 5A. Here, the particle is experiencing an elevated temperature and pressure, causing a reduction in volume in the particle.

FIG. 5B-1 is an exploded view of one of the outer openings in the compressible particle of FIG. 5B. It can be seen that wellbore fluids have encroached into the opening.

FIG. 10A shows a carbon particle suspended in a fluid, such as brine.

FIG. 10B shows a carbon particle embedded in a polymeric rubber matrix, or sheet.

DETAILED DESCRIPTION OF CERTAIN EMBODIMENTS

Definitions

Figure 1A:
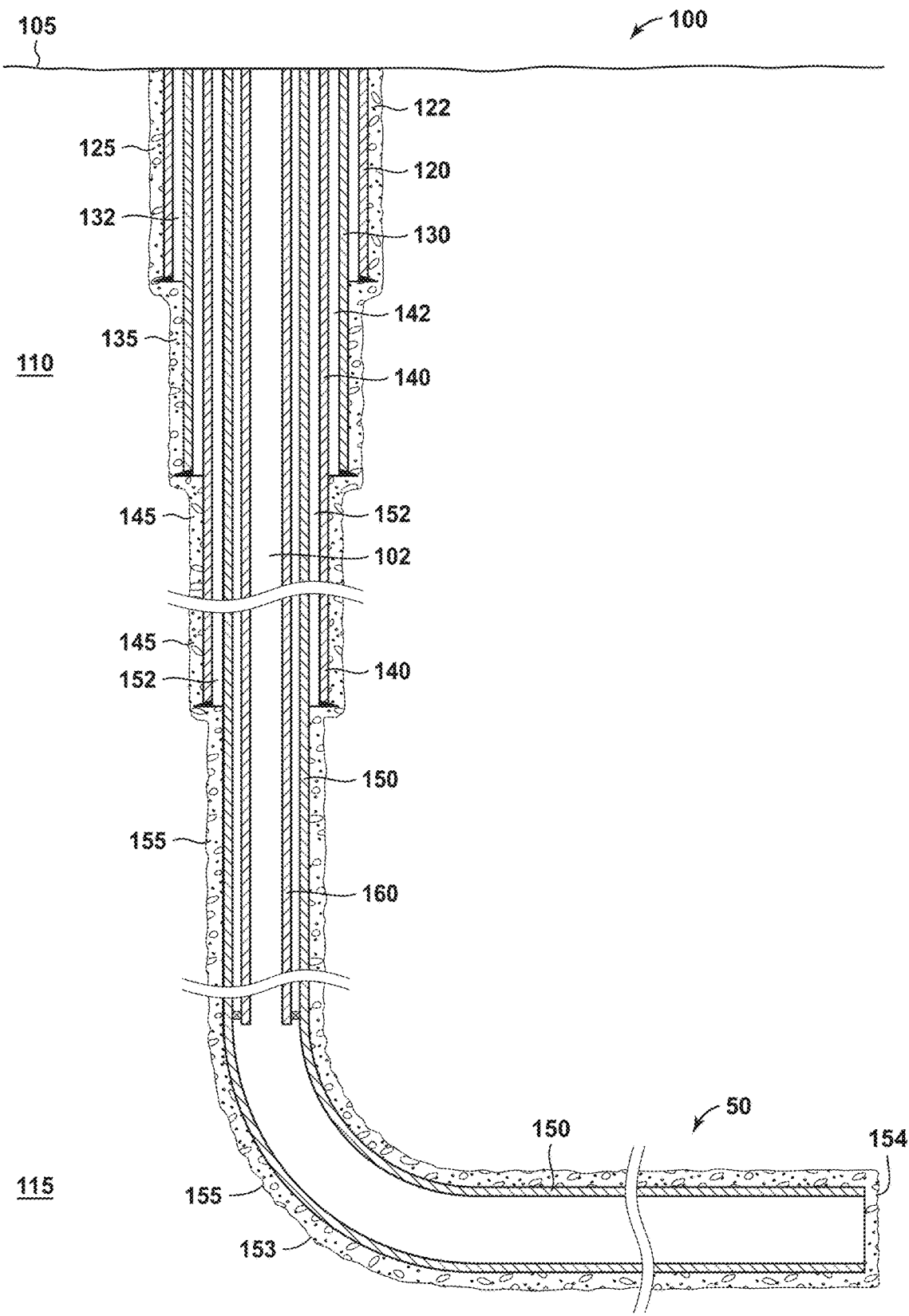
FIG. 1A is a side view of a wellbore. The wellbore has a plurality of casing strings cemented into place, and is completed with a string of production casing.

For purposes of the present application, it will be understood that the term "hydrocarbon" refers to an organic compound that includes primarily, if not exclusively, the elements hydrogen and carbon. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions or at surface conditions. Hydrocarbon fluids may include, for example, oil, natural gas, coalbed methane, shale oil, pyrolysis oil, pyrolysis gas, a pyrolysis product of coal, and other hydrocarbons that are in a gaseous or liquid state, or combination thereof.

As used herein, the terms "produced fluids," "reservoir fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, oil, natural gas, pyrolyzed shale oil, synthesis gas, a pyrolysis product of coal, oxygen, carbon dioxide, hydrogen sulfide and water.

As used herein, the term "fluid" refers to gases, liquids, and combinations of gases and liquids, as well as to combinations of gases and solids, combinations of liquids and solids, and combinations of gases, liquids, and solids.

As used herein, the term "wellbore fluids" means water, hydrocarbon fluids, formation fluids, or any other fluids that may be within a wellbore during a production operation. Wellbore fluids may include a weighting agent that is residual from drilling mud.

As used herein, the term "gas" refers to a fluid that is in its vapor phase. A gas may be referred to herein as a "compressible fluid." In contrast, a fluid that is in its liquid phase is an "incompressible fluid."

As used herein, the term "subsurface" refers to geologic strata occurring below the earth's surface.

As used herein, the term "formation" refers to any definable subsurface region regardless of size. The formation may contain one or more hydrocarbon-containing layers, one or more non-hydrocarbon containing layers, an overburden, and/or an underburden of any geologic formation. A formation can refer to a single set of related geologic strata of a specific rock type, or to a set of geologic strata of different rock types that contribute to or are encountered in, for example, without limitation, (i) the creation, generation and/or entrapment of hydrocarbons or minerals, and (ii) the execution of processes used to extract hydrocarbons or minerals from the subsurface.

As used herein, the term "wellbore" refers to a hole in the subsurface made by drilling or insertion of a conduit into the subsurface. A wellbore may have a substantially circular cross section. The term "well," when referring to an opening in the formation, may be used interchangeably with the term "wellbore."

DESCRIPTION OF SELECTED SPECIFIC EMBODIMENTS

Figure 2A:
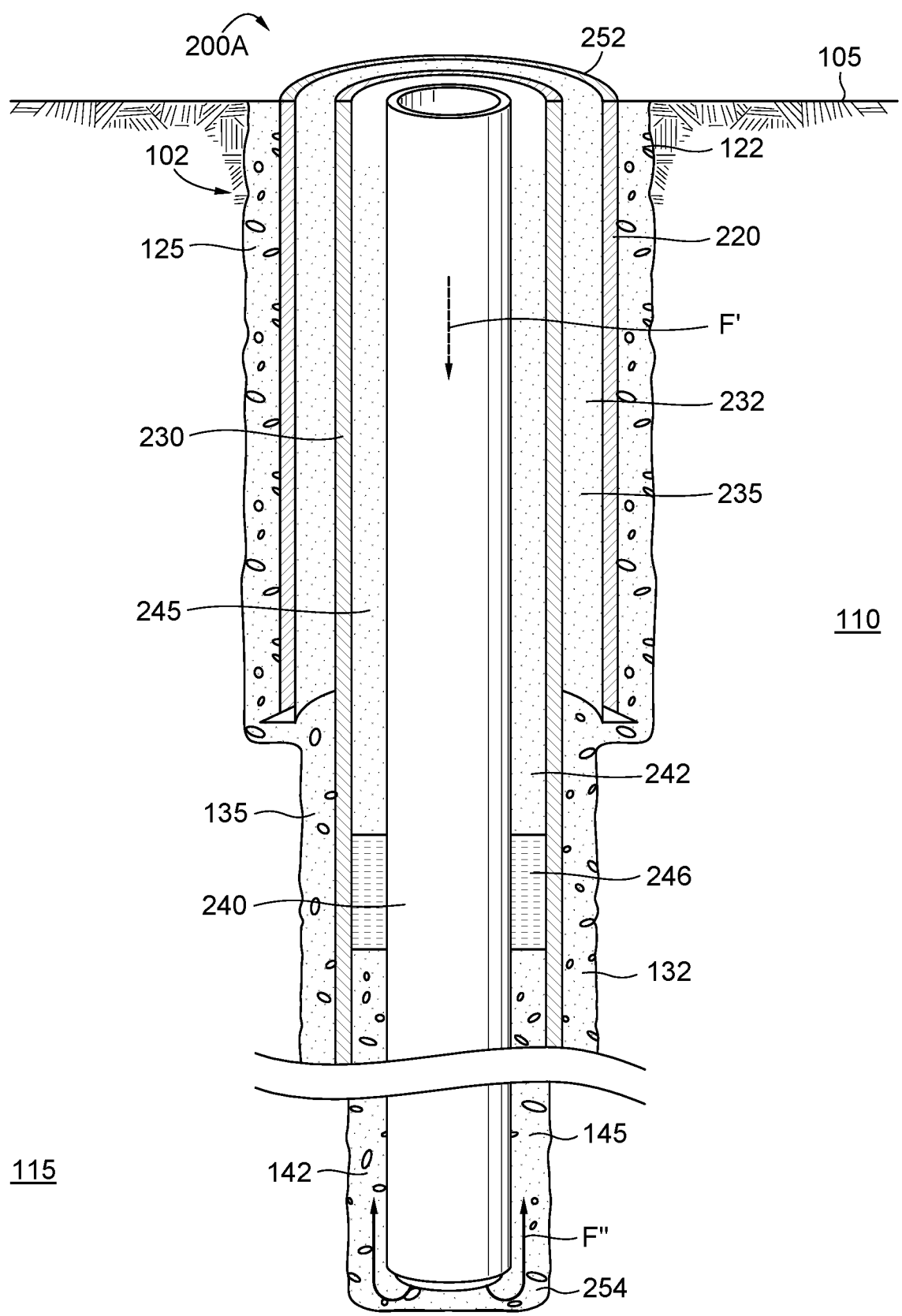
FIG. 2A is a perspective view of a wellbore undergoing completion. A string of casing has been run into the wellbore. Further, a column of fluid has been placed around the string of casing above columns of cement.

FIG. 2A is a perspective view of a wellbore 200A of the present techniques, in one embodiment. The wellbore 200A is undergoing completion.

As with wellbore 100 described above, wellbore 200A defines a bore 102 that has been drilled from an earth surface 105 into a subsurface 110. The illustrative wellbore 200A is being completed vertically into subsurface formation 115. However, it is understood that the wellbore 200A may also be completed horizontally or at any intermediate deviational angle. The wellbore 200A has an upper end 252 at the surface 105, and a lower end 254.

The wellbore 200A is completed with a first string of casing 220, referred to herein as the surface casing. The wellbore 200A is further completed with a second string of casing 230, referred to herein as an intermediate casing. It is understood that in deeper wells, that is, wells completed below 7,500 feet, at least two intermediate strings of casing may typically be used. Finally, the wellbore 200A is being completed with a string of production casing 240. The production casing extends from the surface 105 down to the subsurface formation, or "pay zone" 115.

It is observed that the annular region 122 around the surface casing 220 is filled with cement 125. The cement (or cement matrix) 125 serves to isolate the wellbore from fresh water zones and potentially porous formations around the casing string 120 and near the surface 105.

Annular regions 132, 142 around the casing strings 130, 140 are also filled with cement 135, 145. However, the cement 135, 145 is only placed behind the respective casing strings 230, 240 up to the lowest joint of the immediately surrounding casing string, or cement shoe. Thus, a non-cemented annular region 232 is preserved above the cement (or cement matrix) 135, and a non-cemented annular region 242 is preserved above the cement (or cement matrix) 145. Wellbore fluids 235 reside in the annular region 232 above the column of cement 135, while a fluid mixture 245 is placed in the annular region 242 above the column of cement 145.

Arrow F' is shown in FIG. 2A along production casing 240. This indicates the pumping of fluids into the bore 102. Fluids first include the fluid mixture 245. In accordance with the present techniques, the fluid mixture 245 includes numerous compressible particles. The compressible particles are designed to absorb pressure incident to thermal expansion of fluids during production, such as wellbore fluids 235.

The pumped fluids next include an optional bridge 246. The bridge 246 may represent a denser fluid such as drilling mud. In addition, the pumped fluids include a cement slurry. The fluids are pumped out of the production casing 240 in accordance with Arrow F". The cement slurry sets as the column of cement 145.

Figure 2B:
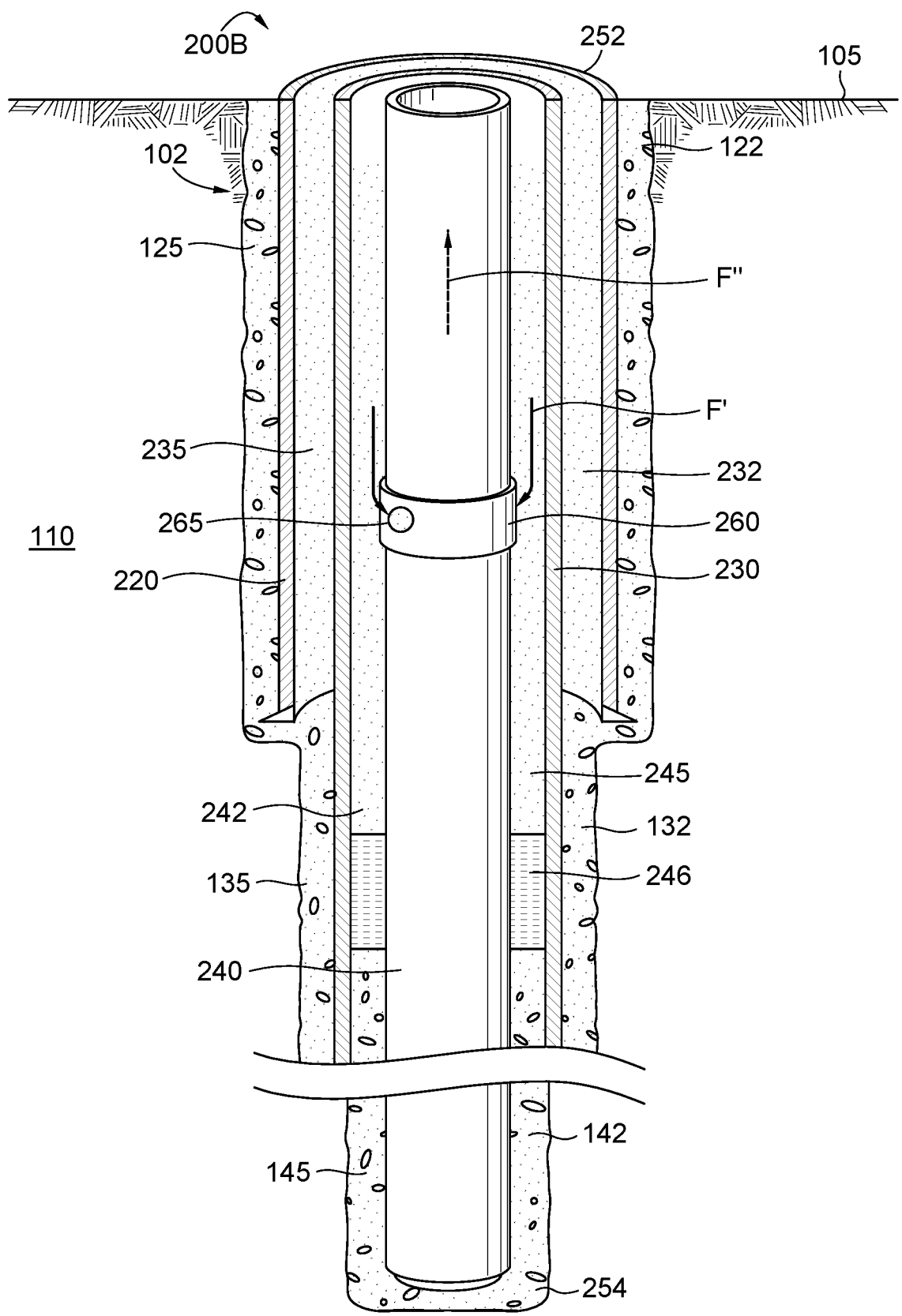
FIG. 2B is a perspective view of the wellbore of FIG. 2A, but in an alternate arrangement. Here, the string of casing includes a reverse circulation valve.

FIG. 2B is a perspective view of a wellbore 200B. Wellbore 200B is the same as the wellbore 200A of FIG. 2A. However, in wellbore 200B a reverse circulation valve 260 is placed along the string of casing 240. The reverse circulation valve 260 includes one or more openings 265 that, when selectively opened, provide fluid communication between an inner bore (not visible) of the production casing 240 and the annular region 242.

Arrow F' is shown in FIG. 2B along the production casing 240. This indicates the pumping of fluids into the bore 102. In this instance, the well is cemented conventionally first. After the cement 145 is hardened, the reverse circulation valve 260 is opened and the bridge 246 is pumped in, followed by the fluid mixture 245. Again, in accordance with the present techniques, the fluid mixture 245 includes numerous compressible particles. In FIG. 2B, the fluids are pumped through the one or more openings 265 in the reverse circulation valve and into the annular region 242. The reverse circulation valve 260 is then closed.

FIGS. 2A and 2B show two optional ways of placing a fluid mixture 245 containing compressible particles into a trapped annulus of the annular region 242. It is desirable that the density of the compressible particles be the same as the carrier medium making up the fluid mixture 245. In that way, the compressible particles may remain somewhat evenly disbursed within the annular region 242 after the well 200B is completed.

Alternatively, it is desirable that the density of the compressible particles reside across a range that is within 0.2 of the specific gravity of the carrier medium used for the fluid mixture 245. In this way, the lighter particles may buoyantly rise within the fluid column to a modest extent, while the heavier particles may gravitationally fall within the fluid column of the annular region 242 to a modest extent.

Unfortunately, manufacturing compressible particles within a fixed density range is an imprecise venture. Therefore, additional, or enhanced measures may be taken to provide for a more uniform distribution of compressible particles within the column of fluid, or fluid mixture, 245 residing within the annular region 242. It is proposed herein to employ a series of annular sealing devices.

Figure 3A:
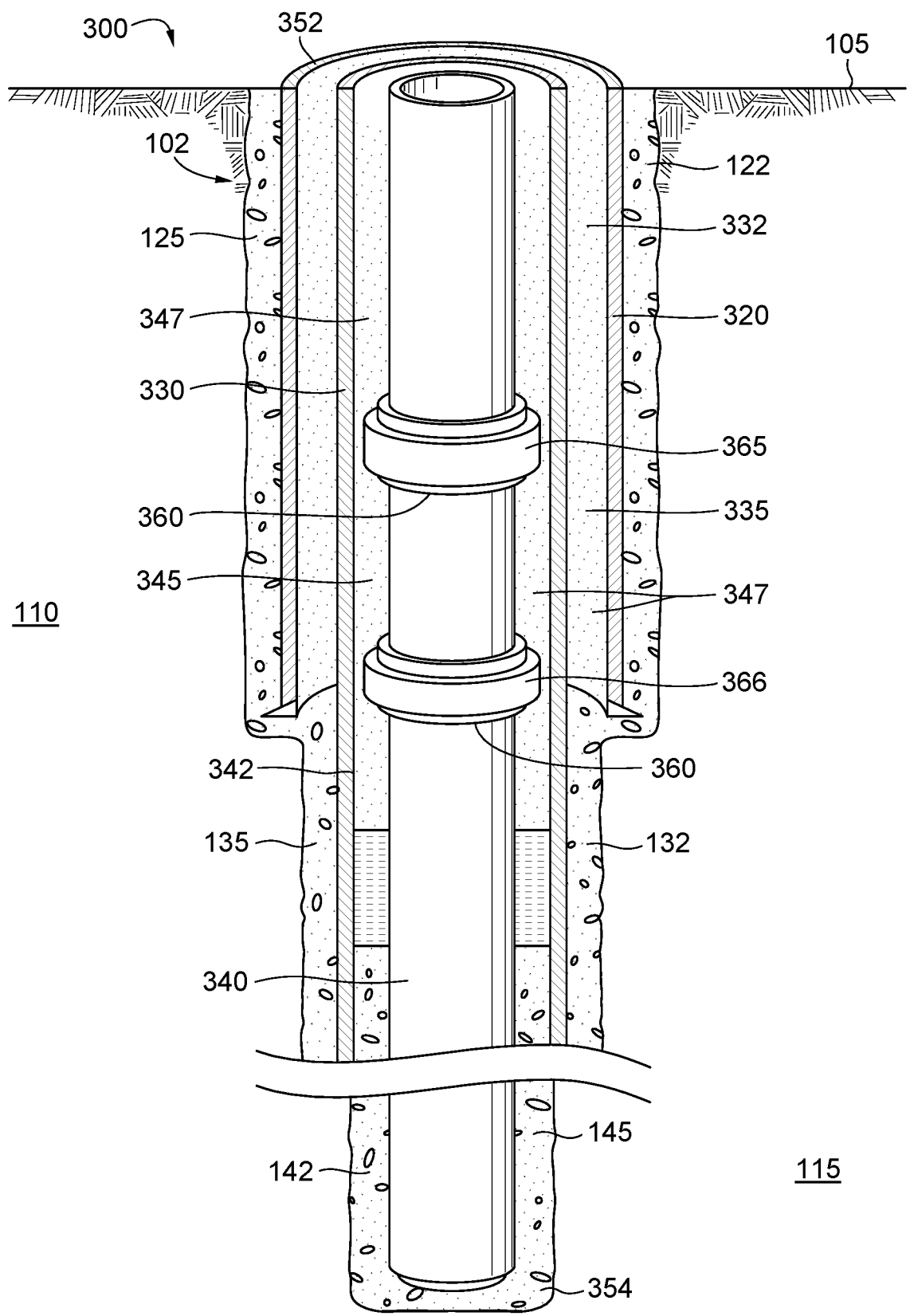
FIG. 3A is a perspective view of a wellbore undergoing completion. A string of casing has again been run into the wellbore, with a column of fluid having been placed around the string of casing. In this instance, the string of casing includes two or more packers having annular sealing elements.

FIG. 3A is a perspective view of a wellbore 300 of the present techniques, in another embodiment. The wellbore 300 is undergoing completion.

As with wellbore 100 described above, wellbore 300 defines a bore 102 that has been drilled from an earth surface 105 into a subsurface 110. The illustrative wellbore 300 is being completed vertically into subsurface formation 115. However, it is again understood that the wellbore 300 may also be completed horizontally or at any intermediate deviational angle. The wellbore 300 has an upper end 352 at the surface 105, and a lower end 354.

The wellbore 300 is completed with a first string of casing 320, referred to again as the surface casing. The wellbore 300 is further completed with a second string of casing 330, as an intermediate casing. Finally, the wellbore 300 is being completed with a string of production casing 340. The production casing 340 extends from the surface 105 down to the subsurface formation, or "pay zone" 115.

It is observed that the annular region 122 around the surface casing 320 is filled with cement 125. Annular regions 132, 142 around the casing strings 330, 340 are also filled with cement 135, 145. However, the cement 135, 145 is once again only placed behind the respective casing strings 330, 340 up to the lowest joint of the immediately surrounding casing string, or cement shoe. Thus, a non-cemented annular region 332 is preserved above the cement matrix 135, and a non-cemented annular region 342 is preserved above cement (or cement matrix) 145. Wellbore fluids 335 reside in the annular region 332 above the column of cement 135, while a fluid mixture 345 is placed in the annular region 342 above the column of cement 145.

Two or more packers 360 have been placed within the wellbore 300. The packers 360 reside in series along the production casing 340. Of course, this is merely representative; packers 360 may also be placed along the intermediate casing 330 (or any other intermediate casing string that may be placed in a wellbore forming a trapped annulus). The packers 360 serve as annular sealing devices, in one embodiment.

Each packer 360 includes an annular sealing element 365. The sealing element 365 represents a rubber or elastomeric ring. When the packer 360 is actuated, the sealing element 365 is extruded into engagement with an inner diameter of the casing 340. Packers having sealing elements are well known, and details concerning composition, fabrication and actuation need not be set forth herein. However, it is preferred for the present methods that the packers 360 be mechanically actuated.

In the view of FIG. 3A, the packers 360 are in their run-in position. This means that a spacing is preserved between the sealing elements 365 and the surrounding casing string 340. Compressible particles 347 may migrate, either gravitationally or buoyantly, across the packers 360. However, once the casing string 340 is in place and the cement 145 is set, the packers 360 may be actuated. This prevents further migration of particles 347 across the packers 360.

Figure 3B:
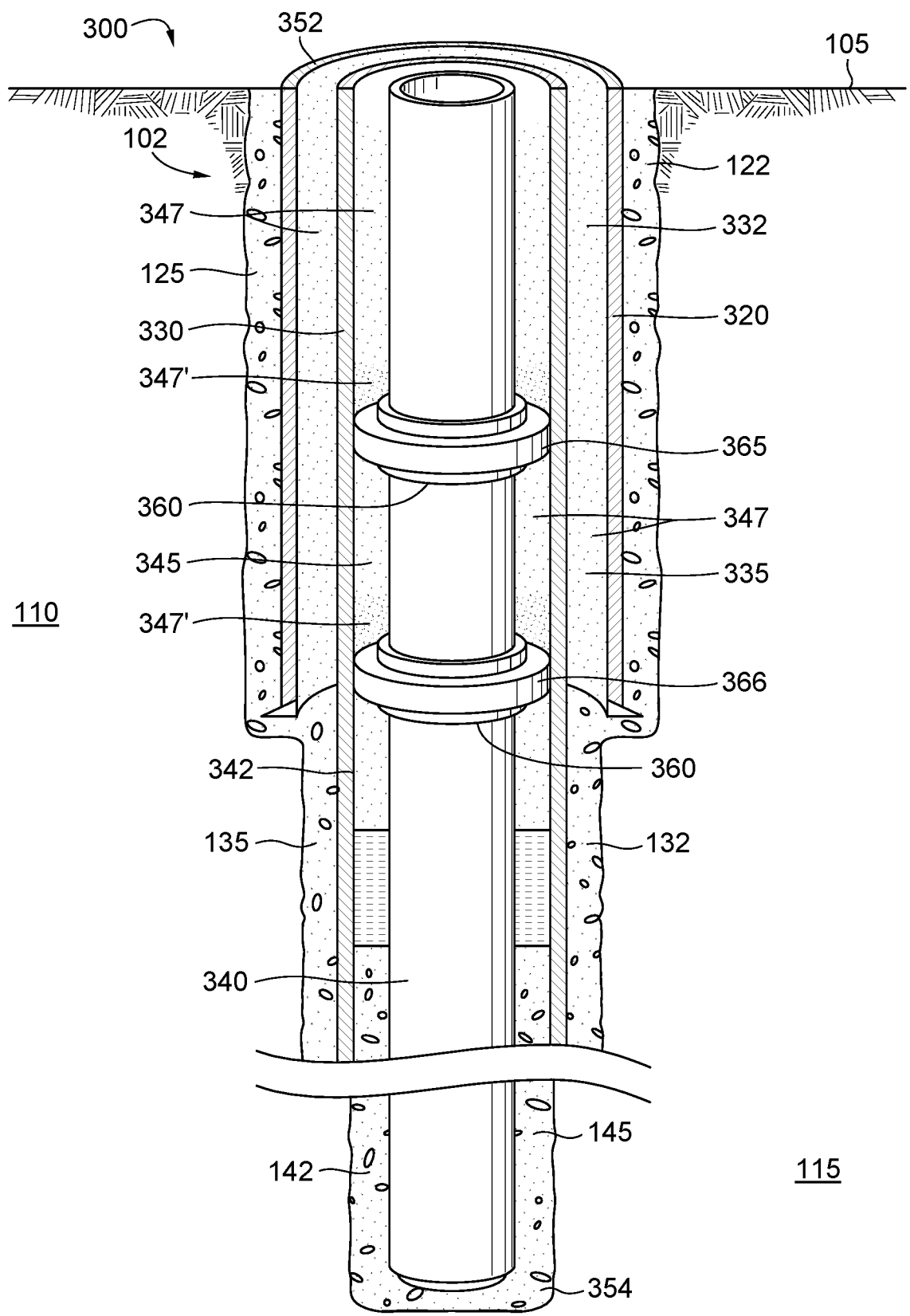
FIG. 3B is another perspective view of the wellbore of FIG. 3A. Here, the two or more packers have been actuated, forming a total annular seal. At least some of the compressible particles have gravitationally settled down onto the annular seals.

FIG. 3B is another perspective view of the wellbore 300 of FIG. 3A. Here, the two or more packers 360 have been actuated. This means that the sealing elements 365 have been extruded into engagement with the surrounding production casing 340, forming a total annular seal. The annular seal prevents compressible particles 347 from migrating across the packers 360, either by moving up or by moving down depending on relative density with the carrier medium.

In the arrangement of FIG. 3B, certain compressible particles 347' have a density that is greater than that of the carrier medium of the fluid mixture 345. Accordingly, these compressible particles 347' have started to gravitationally settle down onto the annular seals 365.

Figure 3C:
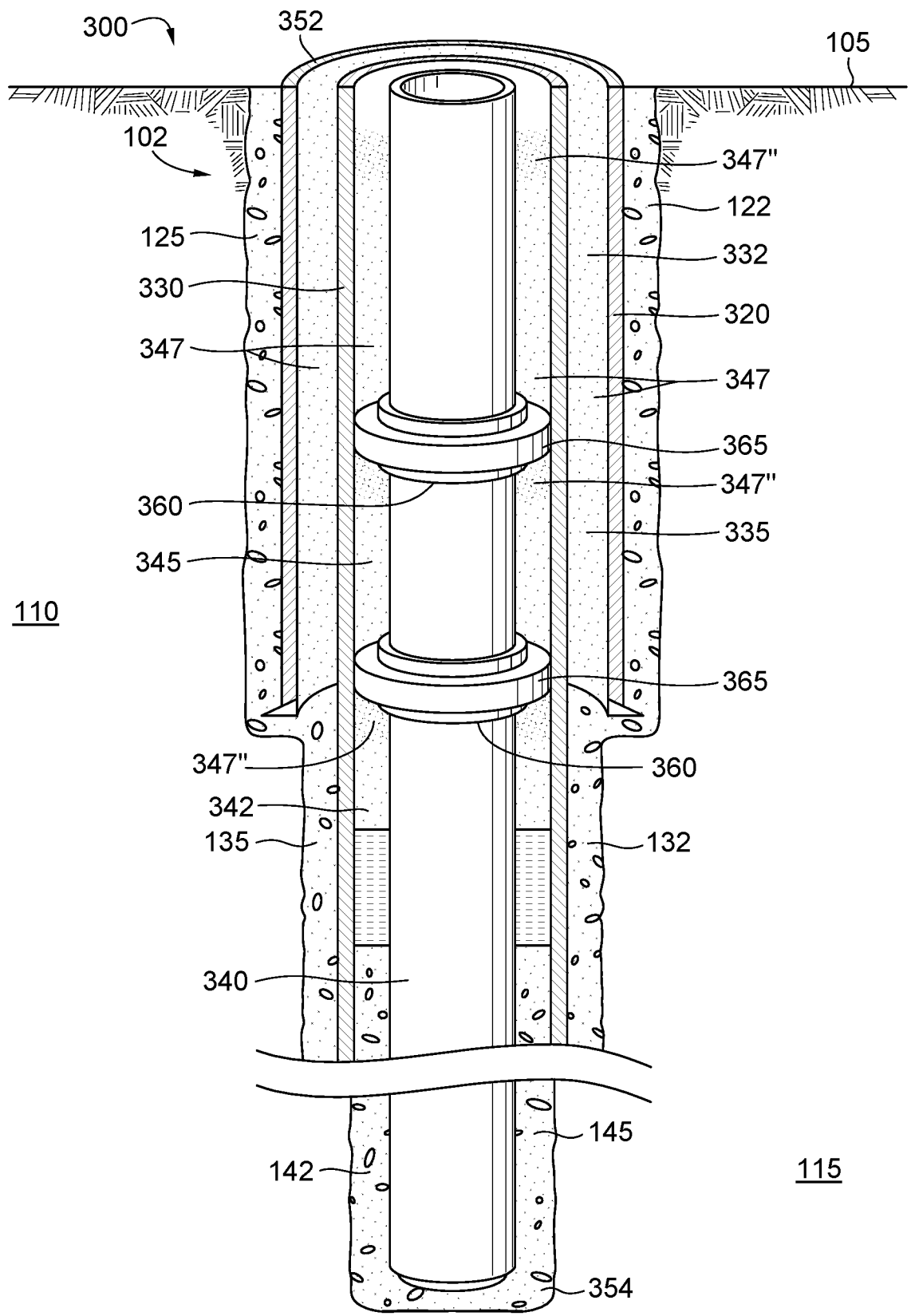
FIG. 3C is another perspective view of the wellbore of FIG. 3A. Here, the two or more packers have again been actuated, forming a total annular seal. At least some of the compressible particles have buoyantly risen up to the annular seals.

FIG. 3C is another perspective view of the wellbore 300 of FIG. 3A. Here, the two or more packers 360 have again been actuated, forming an annular seal. In the arrangement of FIG. 3C, certain compressible particles 347" have a density that is less than that of the carrier medium of the fluid mixture 345. Accordingly, compressible particles 347" have started to buoyantly rise up to the annular seals 365.

The packers 360 shown in FIGS. 3B and 3C are designed to provide a total annular seal. However, as a less expensive (and less complicated) option to the use of packers 360, which are required to be activated once placed within the wellbore 300, the operator may employ an annular barrier mechanism that does not require in situ activation.

Figure 4A:
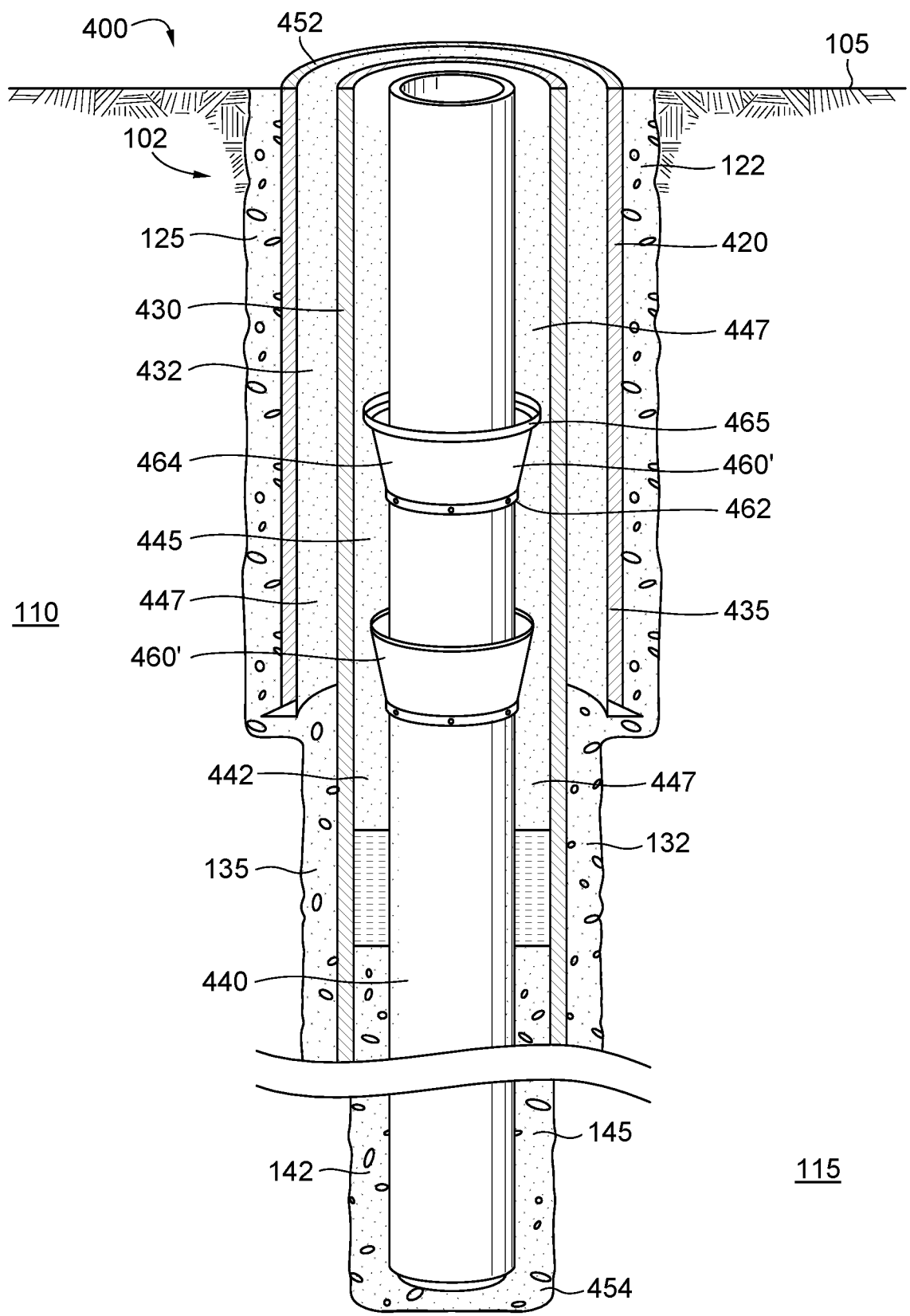
FIG. 4A is a perspective view of a wellbore undergoing completion in an alternate embodiment. A string of casing has again been run into the wellbore, with a column of fluid having been placed around the string of casing. In this instance, the string of casing includes two or more upwardly-facing cups serving as partial annular sealing elements.

FIG. 4A is a perspective view of a wellbore 400 of the present techniques, in an alternate embodiment. The wellbore 400 is undergoing completion.

As with wellbore 100 described above, wellbore 400 defines a bore 102 that has been drilled from an earth surface 105 into a subsurface 110. The illustrative wellbore 400 is being completed vertically into subsurface formation 115. However, it is again understood that the wellbore 400 may also be completed horizontally or at any intermediate deviational angle. The wellbore 400 has an upper end 452 at the surface 105, and a lower end 454 defining total depth.

The wellbore 400 is completed with a first string of casing 420, referred to again as the surface casing. The wellbore 400 is further completed with a second string of casing 430, as an intermediate casing. Finally, the wellbore 400 is being completed with a string of production casing 440. The production casing 440 extends from the surface 105 down to the subsurface formation, or "pay zone" 115.

It is observed that the annular region around the surface casing 420 is filled with cement 125. Annular regions 132, 142 reside around the strings of casing 430, 440 and are also filled with cement 135, 145. However, as noted above the cement 135, 145 is only placed behind the respective casing strings 430, 440 up to the lowest joint of the immediately surrounding casing string, or cement shoe. Thus, a non-cemented annular region 432 is preserved above the column of cement 135, and a non-cemented annular region 442 is preserved above the column of cement 145. Wellbore fluids 435 reside in the annular region 432 above the column of cement 135, while a fluid mixture 445 is placed in the annular region 442 above the column of cement 145.

Two or more cups 460' have been placed within the wellbore 400. The cups 460' reside in series along the production casing 440. Of course, this is merely representative; cups 460' may also be placed along the intermediate casing 430 (or any other intermediate casing string that may be placed in a wellbore forming a trapped annulus).

Each cup 460' is secured to an outer surface of the production casing 440 (or, more precisely, to a joint of production casing 440) by means of a clamp 462. Alternatively, each cup 460' is part of its own pup joint that resides threadedly in series with the joints of production casing 440. Each cup 460' includes a body 464 that extends up from the clamp 462. The body 464 is fabricated from a stiff elastomeric material or, more preferably, from metal. The body 464 forms a bowl around the production casing 440 at a specific depth within the wellbore 400.

Each cup 460' also includes a flanged element 465. The flanged element 465 resides opposite the clamp 462, and extends out into the annular region 442. The flanged element 465 facilitates catching compressible particles 447 that settle down onto the cup 460' once the well is completed. Beneficially, the cup 460' need not be actuated once it is run into the wellbore 400 and before the well is brought on-line.

In the view of FIG. 4A, the compressible particles 447 are disbursed fairly evenly across the length of the fluid column 445. However, after completion begins it is anticipated that at least some of the compressible particles may gravitationally settle.

Figure 4B:
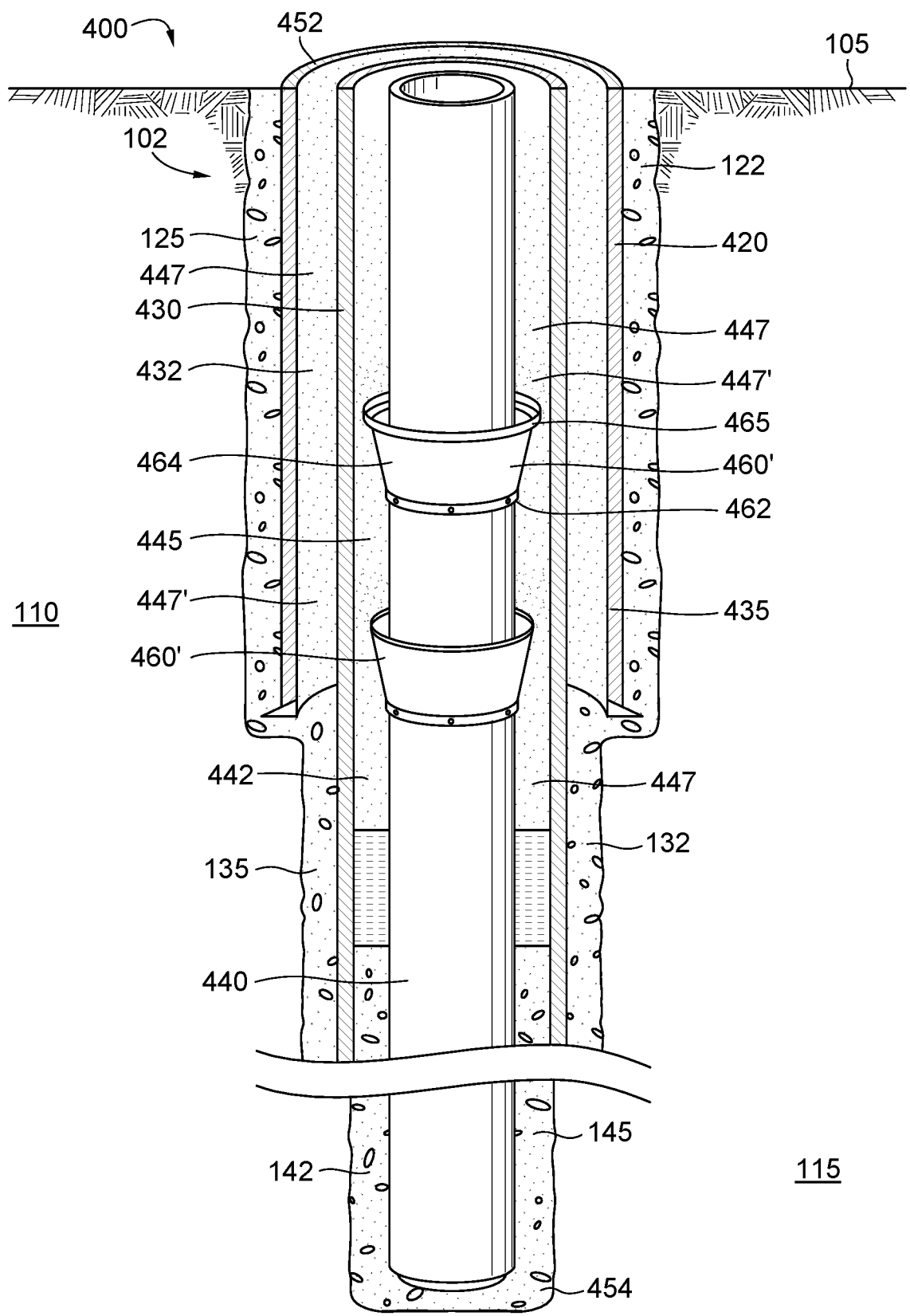
FIG. 4B is another perspective view of the wellbore of FIG. 4A. Here, compressible particles in the annular region have gravitationally settled down towards and into the two or more cups. Note that the cups are oriented upwards.

FIG. 4B is another perspective view of the wellbore 400 of FIG. 4A. Here, compressible particles 447 have begun to settle within the annular region 442. The cups 460' serve to catch portions of the compressible particles 447 during their descent. In this way, the compressible particles remain at least partially disbursed across the fluid column within the annular region 442.

It is understood that in the arrangement of FIG. 4B, certain compressible particles 447' may also have a density that is greater than that of the carrier medium of the fluid mixture 445. Accordingly, compressible particles 447' have also started to gravitationally settle down onto the cups 460'.

Figure 4C:
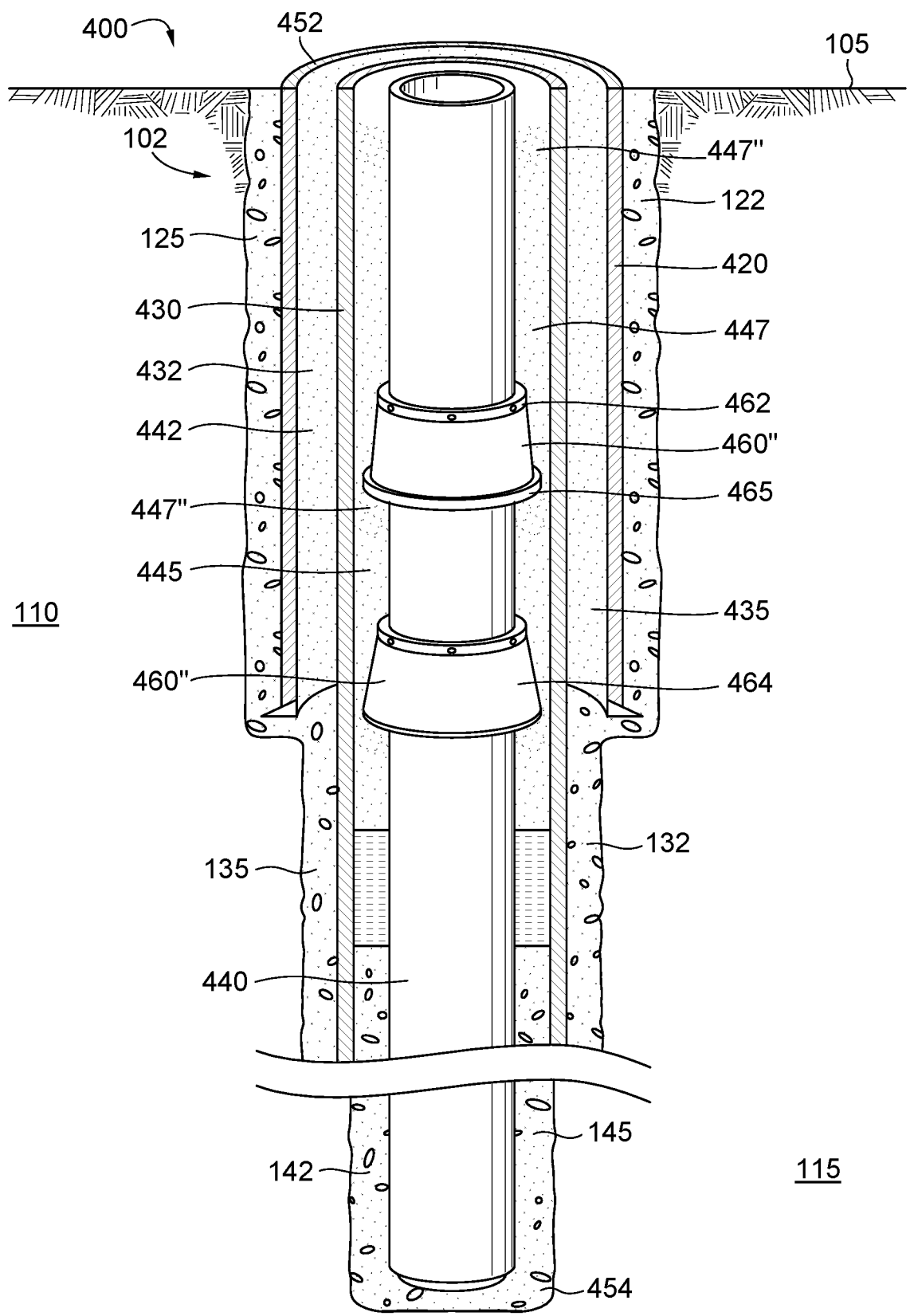
FIG. 4C is a still another perspective view of the wellbore of FIG. 4A. Here, compressible particles in the annular region have buoyantly moved up towards and into the two or more cups. Note that the cups here are oriented downward.

FIG. 4C is another perspective view of the wellbore 400 of FIG. 4A. Here, two or more cups are again placed along the production casing 440. However, in the arrangement of FIG. 4C, the cups (shown at 460") are inverted. In this application, certain compressible particles 447" have a density that is less than that of the carrier medium of the fluid mixture 445. Accordingly, compressible particles 447" have started to buoyantly rise, or float up, to the annular seals 460".

As noted in connection with the descriptions of the present techniques discussed in connection with the FIG. 2, FIG. 3 and FIG. 4 series of drawings, the respective fluid mixtures 245, 345, 445 all utilize compressible particles. It is understood that as production fluids are produced through a production string (shown 160 in FIG. 1A), the fluid mixtures may begin to warm the wellbore due to the warmth of the production fluids. This, in turn, increases the temperature of the fluids within the annular regions 132, 142. The increase in temperature within the defined volumes may cause a corresponding increase in pressure.

The increase in pressure can be detrimental to the integrity of the pipe strings in the wellbore. The compressible particles 347, 447 are designed to mitigate annular pressure build-up, or APB. In a preferred embodiment, the particles making up the compressible material define a carbonaceous particulate with an amorphous shape. The particles are characterized by having a compressibility response (or "reversible volumetric expansion/contraction") of greater than or equal to ($\geq$) 3% at 6,000 psi or at pressure changes between 15 psi and at least 6,000 psi or when subjected to a change in hydrostatic fluid pressure between atmospheric pressure (15 psi) to 6,000 psi. Each of the particles may also have a compressibility response in a fluid media of between 10% and 25% for pressure changes between 15 psi and at least 10,000 psi or when subjected to a change in hydrostatic fluid pressure between atmospheric pressure (15 psi) to 10,000 psi, and more preferably between 14% and 27% for pressure changes between 15 psi and at least 10,000 psi or when subjected to a change in hydrostatic fluid pressure between atmospheric pressure (15 psi) to 10,000 psi. This may be expressed as:

$$-\frac{\Delta V}{V_0} \times 100\% \geq 10\%$$

where: $V_0$=the initial volume of the particles and their dry pore space,
$\Delta V$=infinitesimal change in particle volume (positive value implies a positive change in volume).

In another aspect, the particles have a volume contraction expressed as:

$$-\left(\frac{\Delta V}{V_0}\right) \geq 0.03,$$

where: $\Delta V = V_f - V_0$
$V_0$=the initial volume of the particles and their dry pore space;
$V_f$=the final volume of the particles and their dry pore space; and
$\Delta V$=the volume afforded the surrounding fluid due to skeletal compression and pore collapse, and specifically, the change in particle volume between a reference ambient pressure and when the particles are subjected to a fluid pressure of 10,000 psi.

It is understood that there is a technical difference between degree of compressibility, which is represented as $$\left(-\frac{1}{V_0}\frac{dV}{dP}\right),$$

and volume contraction, which is $$\left(-\frac{\Delta V}{V_0}\right).$$

For purposes of the present disclosure, the term "compressibility response" refers to both concepts.

Compressibility may be measured in terms of volumetric change per pressure change as:

$$\left(-\frac{1}{V}\frac{dV}{dP}\right)$$

with units as 1/psi; and
where: V=the initial volume,
dV=infinitesimal change in volume (positive value implies a positive change in volume); and
dP=infinitesimal change in pressure.

The material is further characterized by being inert to production fluids. Further technical details of a suitable compressible particle are described in U.S. Pat. No. 9,458,703 ('703 patent) issued to Superior Graphite Co., of Chicago, Illinois. The'703 patent is incorporated herein by reference in its entirety.

Note that pressure is also being mitigated via the additional volume that is afforded the fluid as fluid invades into open pore spaces. Ideally, the compressibility of the particles is highest at the pressures the carbon particles may experience down hole.

FIG. 5A is a cross-sectional view of a compressible particle 500A that may be placed in the annular regions 242, 342, 442 of any of the figures discussed above, in one embodiment. Here, the particle 500A represents a solid carbon particle having an amorphous shape. A periphery of the amorphous particle 500A is shown at 530.

Preferably, the particle 500A comprises a petroleum coke that is electro-thermally heated, forming a compressive carbon. The starting material is commercially known as "Calcined Petroleum Coke-Medium High Sulfur." In some designs the maximum sulfur content of the starting material may be as high as 8%. The starting material may be heattreated, with the resultant material comprising a carbonaceous particulate material having a substantially reduced sulfur content, and that has a reversible volumetric contraction in a fluid media of greater than or equal to ($\geq$) 3% of at least 6,000 psi (41.4 MegaPascals (MPa)) as pressure increases or at increasing pressures between 15 psi and at least 6,000 psi or when subjected to a hydrostatic fluid pressure that increases from atmospheric pressure (15 psi) to 6,000 psi, and greater than or equal to ($\geq$) 10% up to 10,000 psi (68.9 MPa) as pressure increases or at increasing pressures between 15 psi and at least 10,000 psi or when subjected to a hydrostatic fluid pressure that increases from atmospheric pressure (15 psi) to 10,000 psi.

The particles are durable under repeated, cyclic loading and sustained loading at high pressure, providing reversible compressibility to fluid. This means that the resultant material can be repeatedly subjected to pressures up to 10,000 psi and "rebound" to its original volume. The compressibility enhancement is greatest between 4,000 psi and 10,000 psi.

The low cost and ease of processing petroleum coke and coal waste make the use of carbon ideal to use as a raw input material. Petroleum coke products calcined to varying degrees may be used. Such products possess a low thermal coefficient of expansion while providing high compressibility. Such materials are available from Superior Graphite Co. of Chicago Illinois.

Beneficially, a plurality of peripheral openings 532 reside around the outer surface 532 of the particle 500A. In addition, intragranular pores 537 are present. The open spaces 532 and the granular pores 537 provide for a porous carbon particle. The openings 532 along the periphery 530 are capable of receiving an ingress of wellbore fluids 535. Note that compressibility for the particles may derive from either material compression or fluid intrusion into pores.

In the view of FIG. 5A, the particle 500A is experiencing what is considered to be a usual pressure within the annular region of a wellbore. The pressure is governed primarily by the hydrostatic head of fluid residing within the annular region. One may refer to this as the ambient pressure. Wellbore fluids 535 remain largely external to the particle 500A.

Figure 1B:
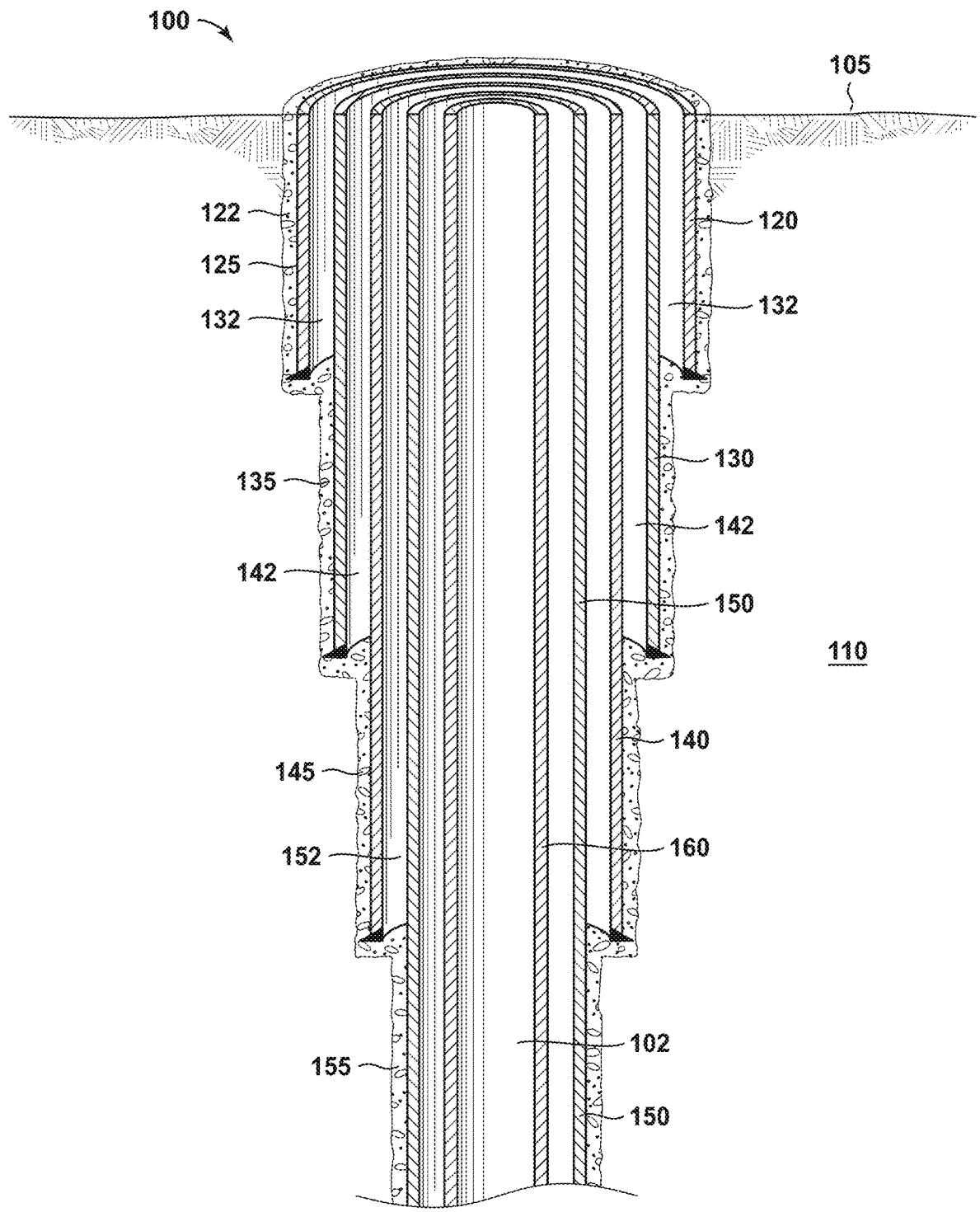
FIG. 1B is a side perspective view of an upper half of the wellbore of FIG. 1A. Three annular regions are shown as trapped annuli.

FIG. 5A-1 is an exploded view of one of the outer openings 532 in the compressible particle 500A of FIG. 5A. It can be seen that wellbore fluids have not significantly invaded the opening 532.

FIG. 5B is another cross-sectional view of the particle 500A of FIG. 5A. Here, the particle 500B is experiencing an elevated temperature and pressure, causing a reduction in volume in the particle. The increase in temperature and pressure is due to thermal expansion of wellbore fluids 535. It can be seen that the peripheral openings 532 are beginning to close even while wellbore fluids 535 encroach into the particle 500B. Fluid intrusion is generally resisted by capillary stress, but overcomes the stress as pressure increases within the wellbore. In addition, a collapse of the intragranular pores 537 is taking place.

Dashed line "D" shows the reference particle shape. This is the original shape of particle 500A in FIG. 5A at ambient pressure. It can be seen that the overall size of the carbon skeleton has reduced from line "D" in response to compressive forces caused by geothermal expansion of wellbore fluids. The compressed particle "frees up" between 5% and 30% of its reference volume "D". The new periphery of the particle 500A is at periphery 530'.

FIG. 5B-1 is an exploded view of one of the outer openings 532 in the compressible particle of FIG. 5B. It can be seen that wellbore fluids have encroached into the opening 532.

In one aspect, the carbon material making up the particle 500B comprises mesocarbon micro-beads or graphite carbons. Alternatively, a composite of polymer and petroleum coke may be formed into beads. For example, a co-polymer of methylmethacrylate and acrylonitrile may be used with graphite. In another embodiment, a terpolymer of methylmethacrylate, acrylonitrile and dichloroethane is used. The dichloroethane may be a vinylidene dichloride. Preferably, the beads are not infused with gas so as to limit expansion of the bead material upon exposure to heat during wellbore operations.

Other polymeric materials may be mixed with the carbon used such as neoprene, polyurethane rubber, vinyl, nitrile rubber, butyl rubber, ethylene propylene diene monomer rubber (or EPDM synthetic rubber), silicone rubber, or combinations thereof. In one aspect, discussed more fully below in connection with FIG. 10B, a polymeric rubber material such as EPDM rubber is applied to the carbon particles as a coating.

Preferably, the particles may have a compressibility response of between 10% and 30% at pressure changes between 15 psi and at least 10,000 psi or when subjected to a hydrostatic fluid pressure between atmospheric pressure (15 psi) to 10,000 psi). More preferably, the particles may have a compressibility response of between 15% and 22% (up to 10,000 psi or at pressures between 15 psi and at least 10,000 psi or when subjected to a hydrostatic fluid pressure between atmospheric pressure (15 psi) to 10,000 psi). Preferably, each of the particles has a resiliency of between 80% and 120%. More preferably, each of the particles has a resiliency of between 87% and 117%.

Figure 6A:
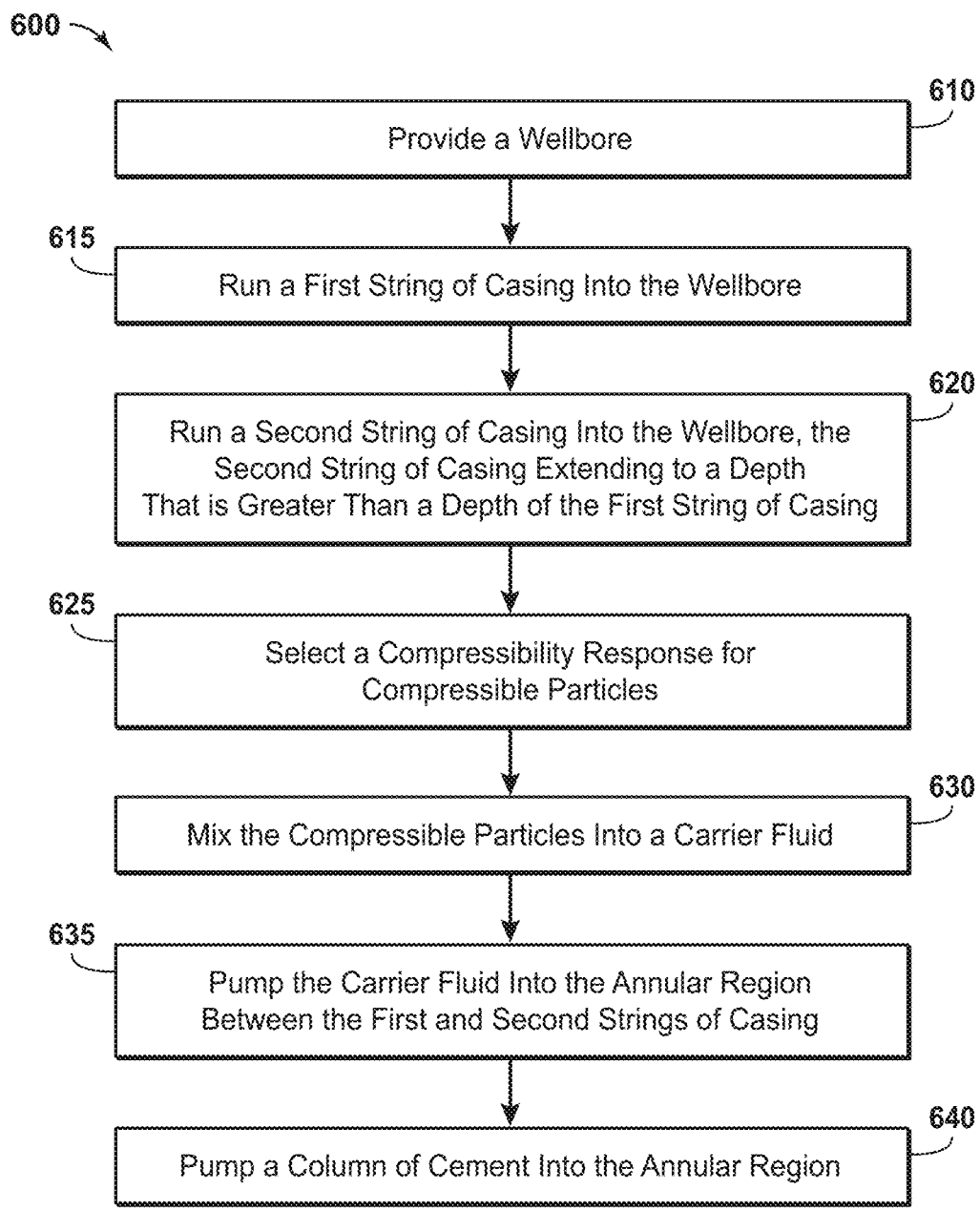
FIGS. 6A and 6B together provide a flow chart showing steps for a method of attenuating pressure in an annular region, in one embodiment.
Figure 6B:
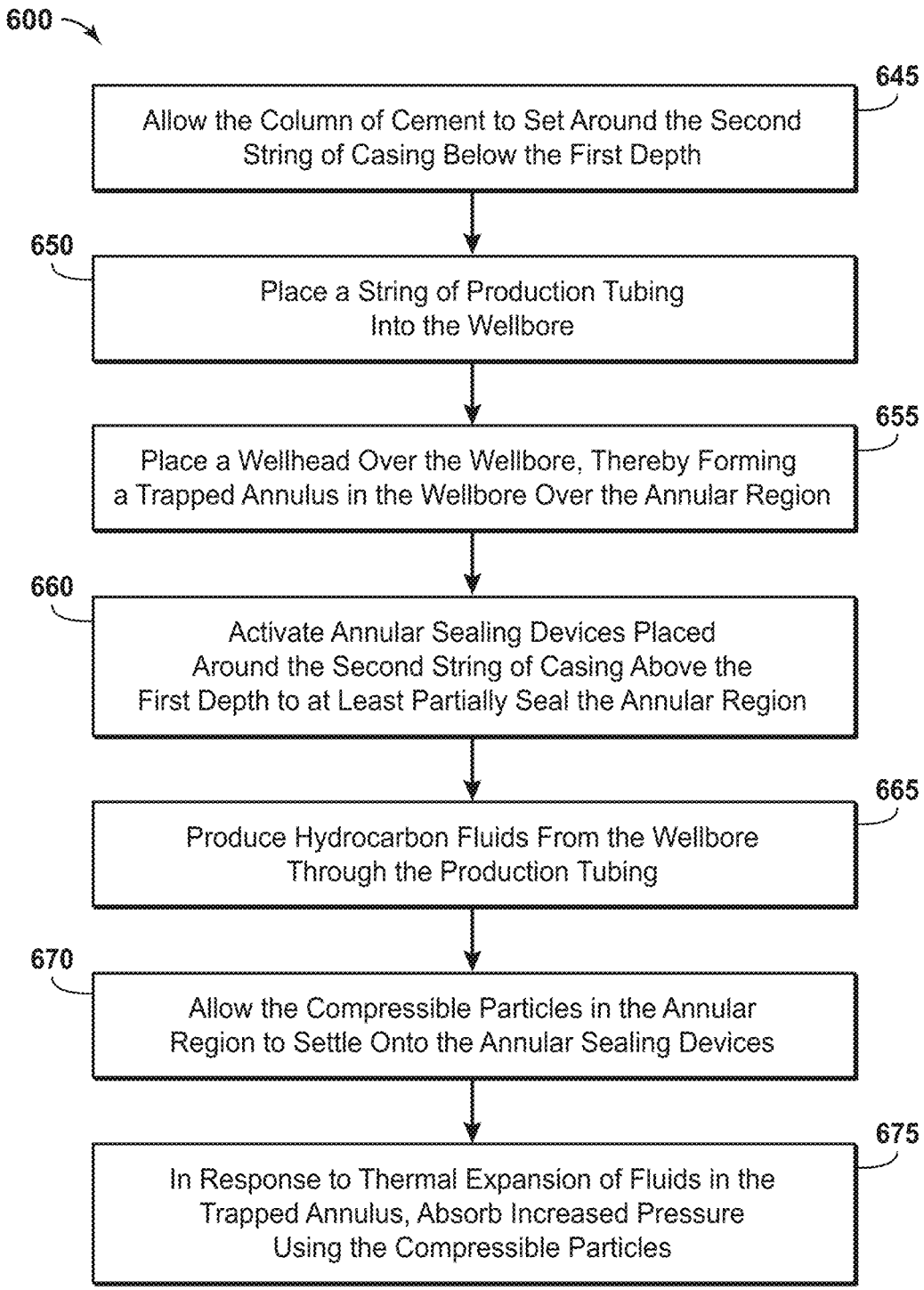

Based on these embodiments, a method of attenuating annular pressure build-up in a wellbore is provided herein. FIGS. 6A and 6B presents a flow chart showing steps for a method 600 of attenuating pressure in an annular region, in one embodiment.

In one aspect, the method 600 first comprises providing a wellbore. This is shown at Box 610. The wellbore may be any wellbore that is completed with at least two, and more likely at least three, strings of casing (not including conductor pipe). An example is the wellbore 400 of FIG. 4A.

The method 600 also includes running a first string of casing into the wellbore. This is provided at Box 615. The first string of casing extends into a subsurface to a first depth. Note that "first string" is a relative term; this does not mean that it is the first string that is run into the wellbore, but only that it is a first string of casing relative to a second string of casing.

The method 600 additionally includes running a second string of casing into the subsurface. This is seen at Box 620. The second string of casing is run into the wellbore after the first string, and extends to a depth that is greater than the first depth. The second string of casing is preferably hung from a wellhead using a liner hanger. The first string of casing surrounds an upper portion of the second string of casing, forming an annular region.

In one aspect, each of the first and second strings of casing is an intermediate casing string. In another aspect, the first string of casing is an intermediate string of casing while the second string of casing is a production casing.

The method 600 further comprises selecting a compressibility response for the compressible particles. This is shown in Box 625. In one expression, the compressible particles together have a reversible volumetric expansion/contraction of ≥3% at pressure changes from 15 psi (atmospheric pressure) to at least 6,000 psi (e.g., in a range between 15 psi and 6,000 psi). As an example, the compressible particles together have a reversible volumetric contraction of ≥3% at pressures increasing from 15 psi to at least 6,000 psi.

Figure 7A:
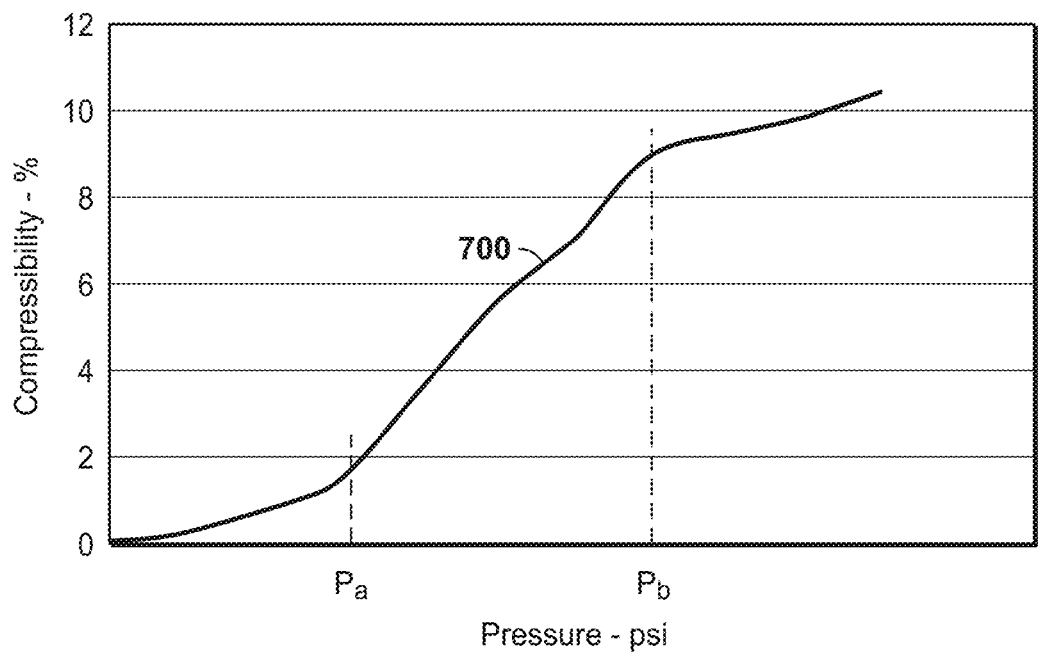
FIG. 7A is a cartesian chart showing compressibility of particles as a function of pressure. This demonstrates a "compressibility response."

FIG. 7A is a Cartesian chart 700A showing a compressibility of a particle. Compressibility is indicated along the y-axis as a percentage of volumetric change, while pressure (measured in PSI) is shown on the x-axis. Line 700 demonstrates a compressibility response, or volumetric expansion/contraction, of the particle as pressure increases. It is noted here that for purposes of reducing a pressure response within a trapped annulus, the term "compressibility response" refers to a volume strain on a collection of particles within a packing, or to the overall volume percent reduction. Individually, some particles may compress more than others.

To maximize the effectiveness of compressible particles, the pressure acting on those particles may ideally be within the area of a compressibility curve that maximizes the volumetric change per pressure change (|dV/dP|). In FIG. 7A, this resides within a first pressure ($P_A$) and a second pressure ($P_B$). To optimize the performance of the particles, they should be placed at a depth (initial hydrostatic pressure) where the particles exhibit high compressibility, and have sufficient volumetric contraction left (e.g., the particles are not close to being fully compressed at the initial hydrostatic pressure).

The compressibility of the particles should be greater than the compressibility of the drilling mud for the majority of the downhole pressure range experienced by the fluid mixture.

When fixed along an annulus, the compressible particles should be designed such that the predicted pressure P at the position of placement is within the maximum dV/dP capabilities of the particles. This may be within the range between $P_a$ and $P_b$ of FIG. 7A. In one aspect, $P_a$ is be the initial pressure state of the annulus before the annulus builds up pressure, while $P_b$ represents a final pressure state of the annulus after productions operations have commenced and the wellbore has warmed.

The depth of this pressure range $P_a$-$P_b$ can be found by calculating the expected pressure profile within the annulus. Expected pressure is a combination of the temperature acting upon the fluid mixture and the hydrostatic head. The end result of this is that compressible particles are placed to maximize the effectiveness of their compressibility response.

As part of selecting a compressibility response, the step of Box 625 may include designing the compressible particles to have an optimum pressure performance at an upper end of the range of expected pressures. This aspect of the step of Box 625 may involve selecting a lowest depth at which the compressible particles reside in the annular region.

Figure 7B:
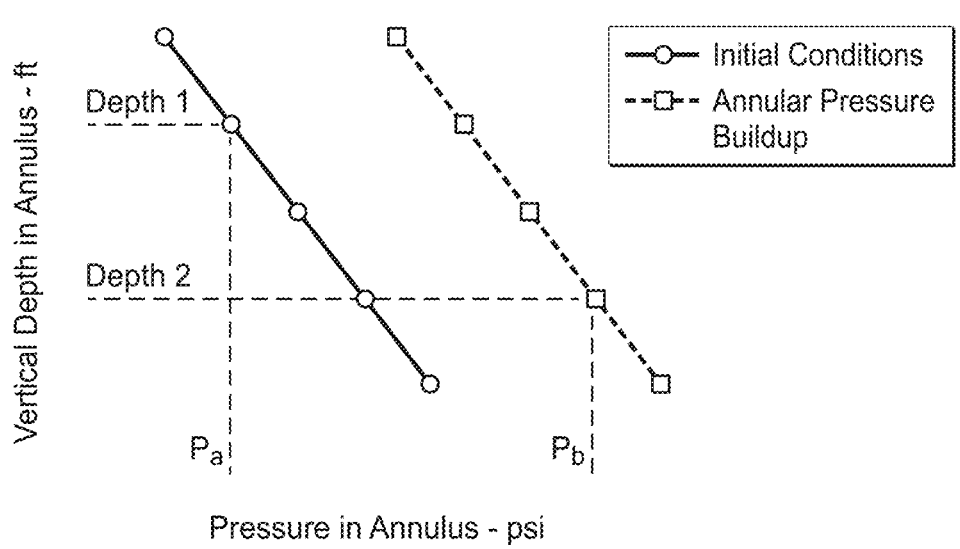
FIG. 7B is a graph showing a pressure profile within the annular region of a wellbore. Pressure is shown as a function of depth, both before and after pressure build-up due to production operations.

FIG. 7B is a graph 700B showing a pressure profile within the annular region of a wellbore. Vertical depth within the annulus is shown on the y-axis, measured in feet, while pressure in the annulus is shown on the x-axis, measured in psi. Once again, the pressure values $P_A$ and $P_B$ are indicated, meaning pressure both before and after pressure build-up.

Two different depths are shown in FIG. 7B, referenced as Depth 1 and Depth 2. Depth 1 indicates an upper portion of a trapped annulus while Depth 2 indicates a lower portion of a trapped annulus. Depth 2 is obviously lower than Depth 1.

As part of the method 600, the operator should mix the compressible particles into a carrier fluid. This is provided at Box 630. Preferably, the compressible particles are mixed into the fluid at a concentration of 5% to 40% by volume. The greater the concentration of particles there is, the greater the overall compressibility of the carrier fluid in the column. Thus, overall compressibility is impacted not only by the degree of compressibility of the individual particles along the carrier fluid, but also by the number of particles provided.

The carrier fluid may comprise drilling mud. The drilling mud may have weighting agent particles. For example, the drilling mud may be an aqueous drilling fluid, and the weighting agent particles comprises barite, hematite, ilmenite, or combinations thereof. In one aspect, each of the weighting agent particles has a particle size that is at least 150 times smaller than a size of the compressible particles. In another aspect, the particles making up the weighting agent have a diameter that is substantially similar to a diameter of the compressible particles. The similar particles sizes may increase settled permeability, and provide a favorable settlement configuration wherein the weighting agent particles settle out first.

Preferably, the compressible particles are blended into the carrier fluid at a surface to form the fluid mixture, before pumping the fluid mixture into an annular region. Some variation in particle size may be provided for the weighting agent particles. In connection with the mixing step of Box 630, the operator may choose to add additives to the mixture in order to increase the rheological properties (e.g., plastic viscosity, yield point value, and gel strength) of the mixture. Such additives may include one or more natural and/or synthetic polymeric additives, polymeric thinners, or flocculants. The purpose of such additives is to alter the gel strength of the carrier fluid to inhibit particle settling.

Alternatively, the operator may provide an electric or magnetic charge to the particles to keep them suspended. Alternatively still, the particles may be coated with a material having an electrical or magnetic charge to inhibit settling. In any instance, a fluid mixture is formed.

Preferably, each of the compressible particles comprises carbon fibers or carbon particles. Each of the compressible particles is fabricated to partially collapse in response to thermal expansion of fluid within the annulus. Each particle may have a coating of polymeric rubber material, such as ethylene propylene rubber ("EPR). Other examples of coating may include hydrogenated nitrile butadiene rubber (HNBR), nitrile butadiene rubber (NBR), and fluoroelastomer (FKM).

In one aspect, the compressible particles have outer diameters that are between 40 micrometers or microns (μm) and 1300 μm (in dry state) or between 100 μm and 900 μm. In one aspect, an average diameter of the compressible particles is between 350 μm and 450 μm.

In one aspect, the carrier fluid is brine and each of the compressible particles has a specific gravity that is 1.5 to 2.0 times that of the carrier fluid. In one aspect, each of the compressible particles may have a density of between 12.0 ppg and 12.8 ppg, inclusive, at ambient conditions. Note that because the particles are, by design, compressible, particle density is dependent on pressure. At ambient conditions, the particles' density is around 12.5 ppg. If pressured to 10,000 pound per square inch ("psi"), the density of the particles may increase to between 14.5 ppg and 15.5 ppg.

In other embodiments, the density may vary. For example, the density may be measured by the mass of the particles and volume of the particles. For the closed pores of particles, which is inaccessible to fluid ingress, the closed pores contribute to the particle volume, while open pores, accessible to fluid ingress, do not contribute to the particle volume. As such, the volume that determines the buoyancy the particles experience when submersed may vary between particle variations for open pores and closed pores.

In one embodiment, the compressible particles comprise: first compressible particles having a first degree of compressibility (or compressibility response); and second compressible particles having a second degree of compressibility (or compressibility response); and wherein the first degree of compressibility is higher than the second degree of compressibility.

In another embodiment, the compressible particles comprise: first compressible particles having a first density; and second compressible particles having a second density; and wherein the first density is greater than the second density.

The method 600 also comprises pumping the carrier fluid into the annular region between the first and second strings of casing. This is offered in Box 635. In one aspect, the carrier fluid is pumped in ahead of the cement column. Alternatively, the carrier fluid may be pumped directly into the annular region through a reverse circulation valve, after the cement slurry has been placed below the first depth. This is shown at Box 640.

In one aspect, the particles are placed in the well in a thixotropic, or shear thinning, fluid. Such a fluid may have rheological properties which allow it to be pumped during placement without causing excessive pressure in the pumping system, but may develop higher viscosity at low shear rates. This retards the settling or floating of the solids content of the fluid, including the compressible particles.

The method 600 additionally includes placing a column of cement around the second string of casing below the first depth. This is shown at Box 645. Then, a wellhead is placed over the wellbore, thereby forming a trapped annulus in the wellbore over the annular region. This is indicated at Box 655. The fluid mixture resides within the trapped annulus.

The method 600 may then further comprise: placing a string of production tubing into the wellbore within the second string of casing (shown at Box 650); producing hydrocarbon fluids from the wellbore (shown at Box 665); and in response to thermal expansion of the fluid mixture in the trapped annulus, absorbing increased pressure using the compressible particles (shown at Box 675).

In accordance with the present disclosure, the wellbore comprises at least one, and preferably two or more, mechanical barriers. These may be referred as annular sealing devices. The annular sealing devices are placed within the annulus before the fluid mixture is pumped into the annulus (Box 635). Each mechanical barrier is configured to restrict (i) gravitational settling, (ii) buoyant rising, or both of the compressible particles along the fluid column.

The method 600 includes activating the sealing devices, wherein the sealing devices are placed around the second string of casing above the first depth. This is provided in Box 660. Activating the annular sealing devices at least partially seals off the annular region. The sealing devices, thus, serve as expandable mechanical barrier.

In one aspect, each of the mechanical barriers comprises a packer. The step of Box 660 then comprises actuating the packers after the fluid mixture is pumped into the annulus. The packer fills the entirety of the cross-sectional area of the annulus. Optionally, the sealing element of the packer is pressure-permeable to a clean fluid, but not to particles so as to restrict movement of solids including the compressible particles. The sealing element is polymeric, or elastomeric, in composition.

In another aspect, each of the compressible packers comprises a cup. In this instance, the step of Box 660 simply means placing the cups at designated depths along the trapped annulus. The cup serves as a partial barrier, meaning that it partly fills the cross-sectional area of the annulus. This allows flow-by of solids-laden fluid during compressible particle placement.

Finally, the method 600 comprises allowing the compressible particles to settle onto the annular sealing devices. This is seen in Box 670. It is noted that after the well is completed, the compressible particles are ideally somewhat dispersed along the annular region. Preferably, a specific gravity of each of the compressible particles is within plus/minus 0.2 of a specific gravity of the carrier fluid. This enables a relatively uniform distribution.

However, in the method 600, the annular sealing devices help prevent the compressible particles from gravitationally settling at the bottom of the annular region or from buoyantly migrating towards the top of the annular region, depending on the density of the particles relative to the carrier medium. In the case of cups, the proportion of solids content that settles out of the desired interval, and the placement of multiple such devices along the length of the annulus, may allow for multiple settling points, reducing the risk of forming a pressure-impermeable solids layer at a single point in the well.

In addition to the method 600 of attenuating annular pressure build-up in a wellbore, a separate method of placing compressible particles within a wellbore is provided.

Figure 8A:
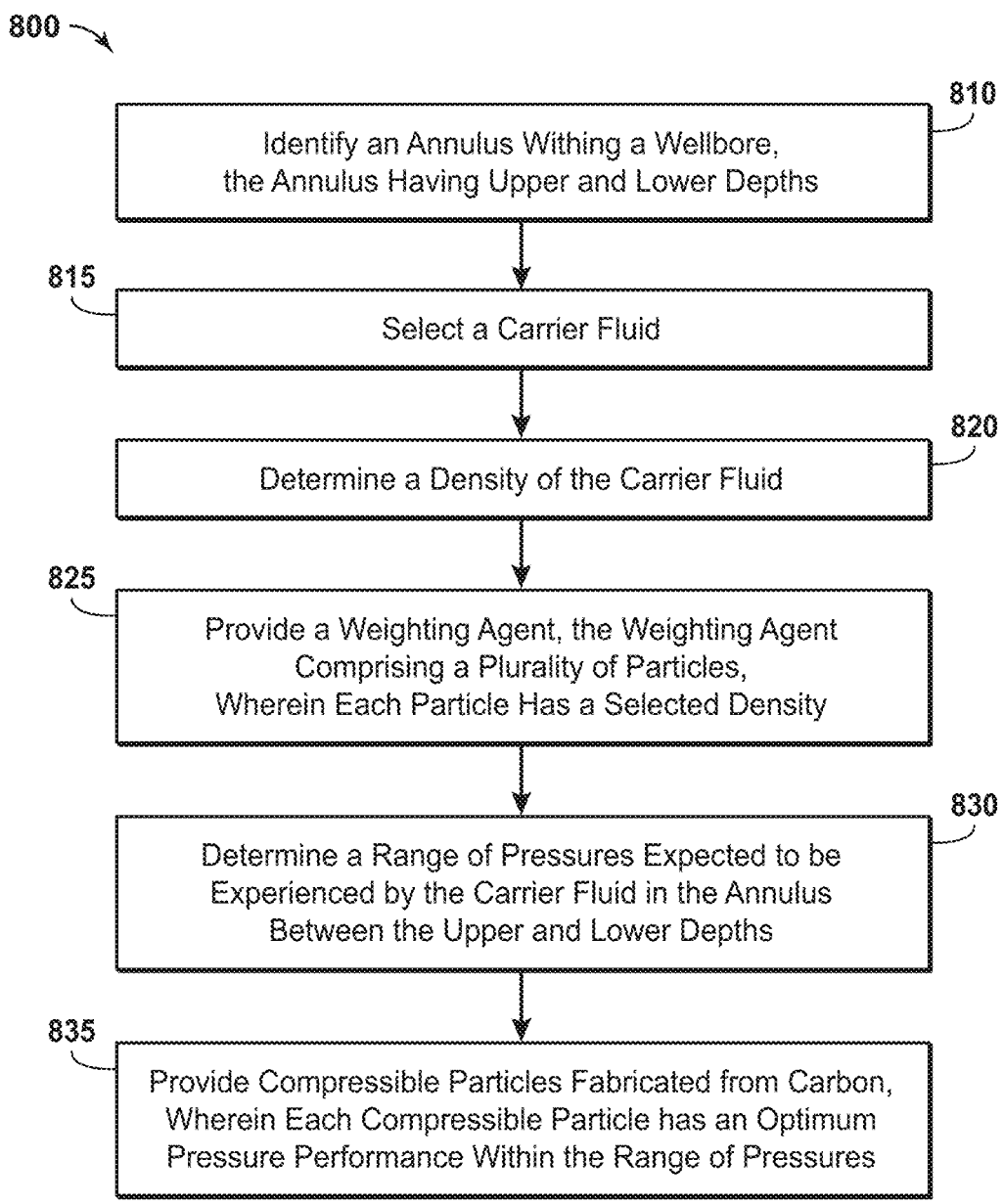
FIGS. 8A and 8B together provide a flow chart showing steps for a method of preparing a mixture of compressible particles for a wellbore annular region.
Figure 8B:
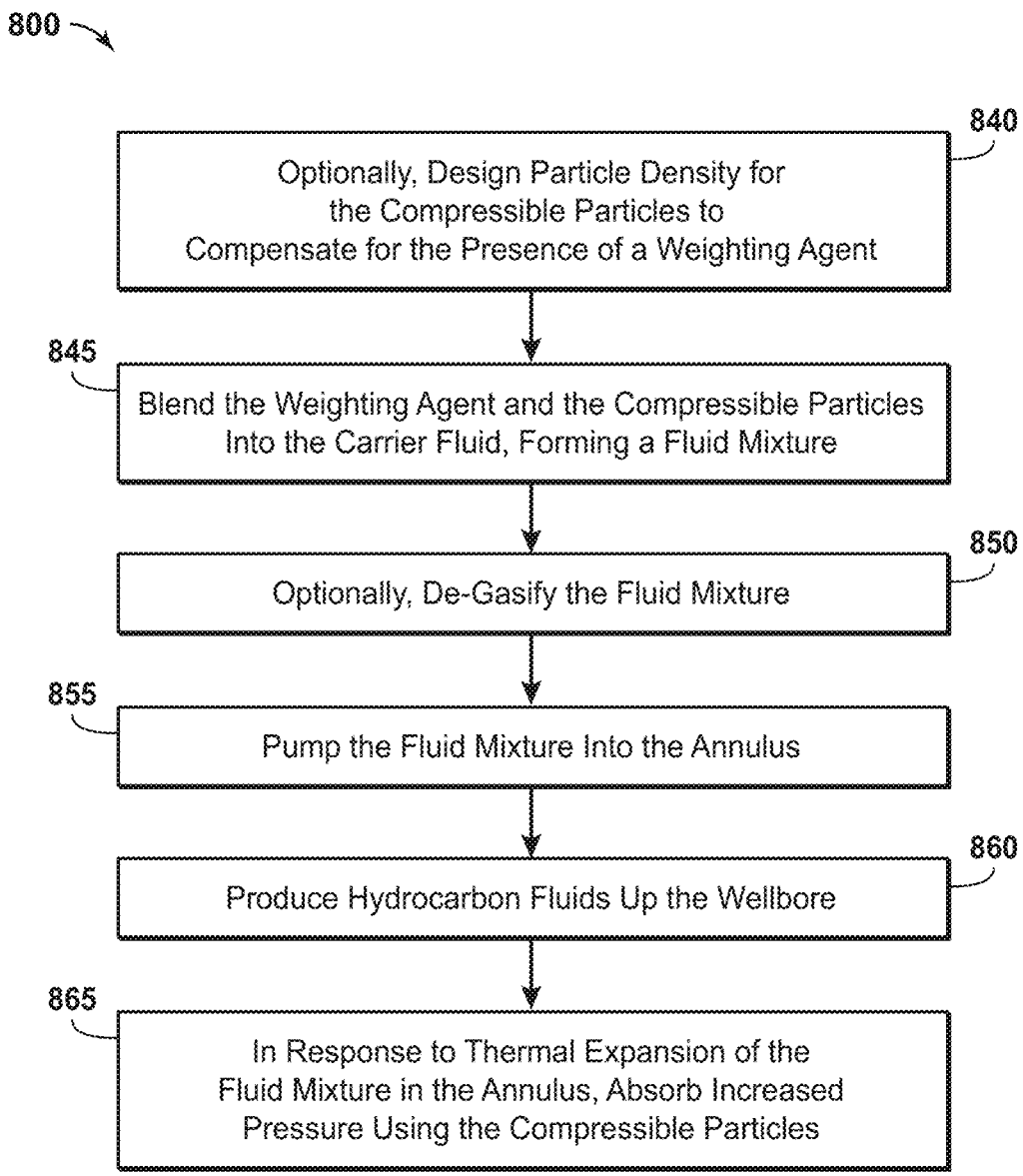

FIGS. 8A and 8B together provide a flow chart showing steps for a method 800 of placing a fluid mixture having compressible particles into a wellbore annular region. In one embodiment, the method first includes identifying an annulus within a wellbore. This is provided in Box 810. The annulus, or annular region, may have upper and lower depths.

The method further comprises selecting a carrier fluid. This is offered in Box 815. The carrier fluid may be fresh water, brine or an aqueous drilling fluid. However, a hydrocarbon (or oil-based) drilling mud may be considered. Alternatively, the carrier fluid may be a thixotropic fluid.

The method 800 also includes determining a density of the carrier fluid. This is provided in Box 820. Fresh water, of course, has a specific gravity of 1.0. Where salt or minerals are present, the specific gravity may be increased. The carrier fluid may need to be blended to ensure a generally homogenous composition and specific gravity.

The method 800 additionally, and optionally, comprises providing a weighting agent for the carrier fluid. This is done when the carrier fluid is a drilling mud. This step is indicated at Box 825.

Those of ordinary skill in the art will understand that during the drilling of a wellbore, a weighting agent is typically used as part of the drilling fluid. The weighting agent increases the density of the fluid and, thereby, increases the hydrostatic head acting down on the drill bit and the surrounding formation as the drill bit rotates and penetrates downhole. The weighting agent helps act against high formation pressures that may "kick" into the wellbore. The weighting agent also forms a "cake" against the wellbore wall to prevent fluid loss during circulation. Examples of weighting agents include barite, salt, barite, hematite, ilmenite, or combinations thereof.

Weighting agent particles may remain in the wellbore after casing strings are run into the hole. This means that as the fluid mixture (that is, the carrier fluid with compressible particles) is pumped downhole, the mixture may likely pick up weighting agent particles en route to the annular region. This may affect the buoyancy of the compressible particles. Thus, the step of providing a weighting agent of Box 825 may happen automatically.

The method 800 also includes determining a range of pressures expected to be experienced by the carrier fluid. This is shown in Box 830. It is understood that the pressure in the annular region may be less at upper depths than at the lower depths.

The method 800 further comprises providing compressible particles. This is shown at Box 835. The compressible particles are preferably fabricated from carbon. The individual compressible particle have an optimum pressure performance within the range of pressures. Preferably, the carbonaceous particles are designed to have an optimum pressure performance at an upper end of the range of expected pressures.

Figure 9:
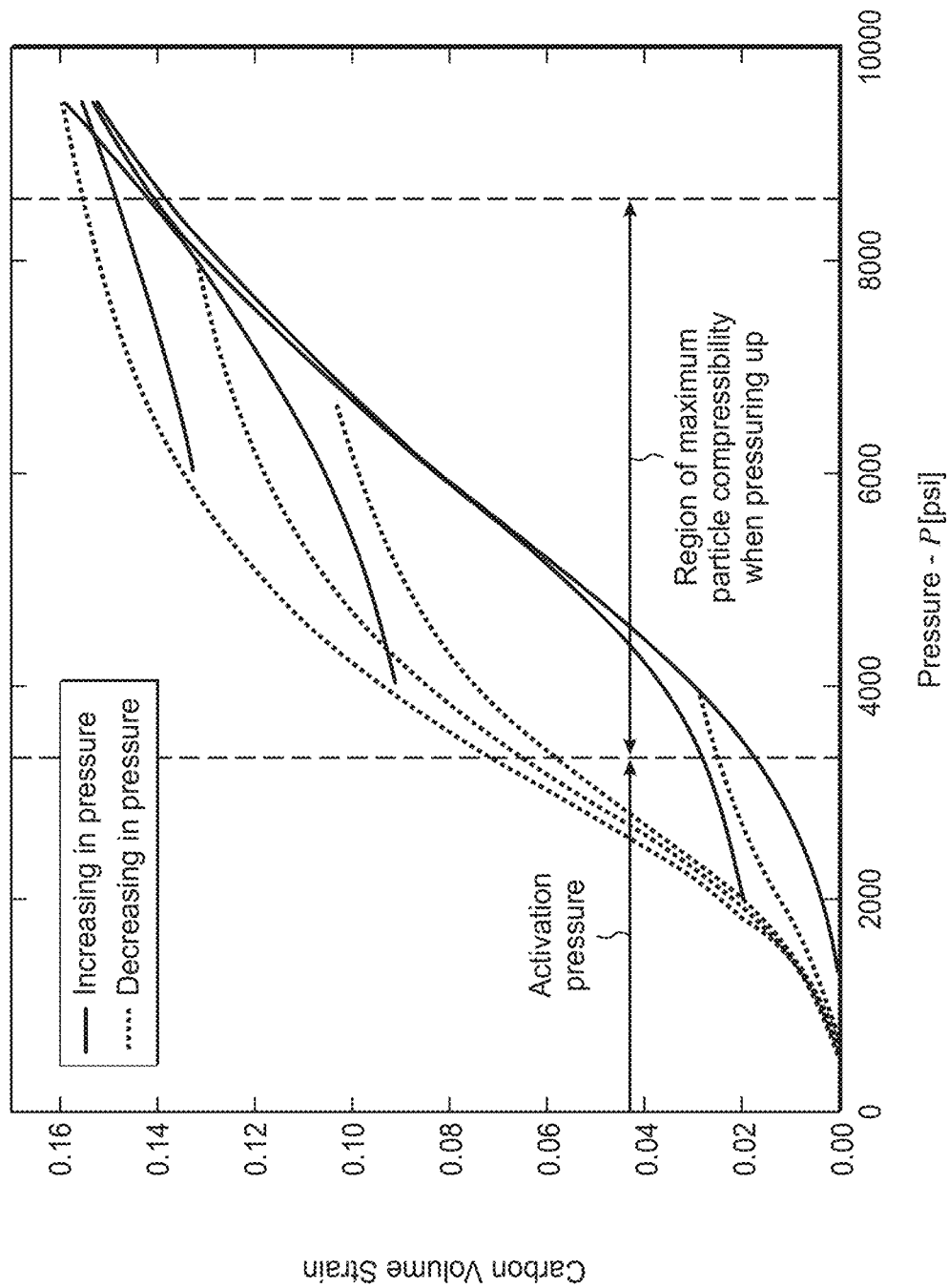
FIG. 9 is another cartesian chart showing volume strain applied to particles as a function of pressure. This demonstrates collective particle "strain" within a wellbore.

FIG. 9 is a cartesian chart showing volume strain applied to graphitic particles produced by Superior Graphite Co. as a function of pressure. This demonstrates collective particle "strain" within a wellbore. A range of pressures is shown, indicating pressures experienced by the compressible particles within the annular region. The individual compressible particle have an optimum pressure performance within the range of pressures. Using the chart of FIG. 9, the method 800 may comprise determining an initial pressure state ($P_a$) of the annular region and a final pressure state ($P_b$) of the annular region between the upper and lower depths as part of selecting a compressibility response for the particles.

Preferably, each of the plurality of compressible particles has a reversible volumetric expansion/contraction of ≥3% at pressures of at least 6,000 psi or at pressures between 15 psi and at least 6,000 psi or when subjected to a hydrostatic fluid pressure between atmospheric pressure (15 psi) to 6,000 psi. In one aspect, each of the compressible particles has a compressibility of between 10% and 30%, up to 10,000 psi or at pressures between 15 psi and at least 10,000 psi or when subjected to a hydrostatic fluid pressure between atmospheric pressure (15 psi) to 10,000 psi.

In one embodiment, particles having different degrees of compressibility are employed. For example, the compressible particles may comprise first compressible particles having a first selected degree of compressibility, and second compressible particles having a second selected degree of compressibility. The first degree of compressibility is higher than the second degree of compressibility.

It is noted that the process of circulating the carrier fluid into the wellbore may carry the compressible particles to a depth where the hydrostatic head acts on the particles. Ideally, the particles are placed at a depth sufficient to allow the hydrostatic pressure to "pre-compress" the particles to above their minimum activation pressure. This may ensure further pressure changes activate the compressibility response of the particles.

The concept of using an activation pressure is demonstrated in the plot of FIG. 9. This, again, depicts the path-dependent compressibility of carbon particles that were subjected to varying states of fluid pressure. For the particles in question, their maximum compressibility is experienced at approximately 6,000 psi when monotonically increasing the pressure from atmospheric starting conditions (15 psi). As seen in the figure, the particles have their largest compressibility between approximately 3,000 psi and 9,000 psi to 10,000 psi, when the starting pressure is low (atmospheric) and pressure is increased monotonically. The magnitude of compressibility is measured by the slope of the compression (or strain) curves in FIG. 9.

Because the particles experience a path-dependent compressibility—that is to say, the particles demonstrate hysteresis in their strain vs. pressure relation—the particles' response to a change in fluid pressure and ability to mitigate APB depends on how deep the particles are placed into the well. The placement method and circulation depth should consider the effect of particle hysteresis to maximize APB relief.

Once the carrier fluid is placed within the annulus in the annular region, some re-settling of particles may likely take place. Particles having the lowest density may slowly rise to the top of the column in the annular region while particles having the highest density may tend to settle slowly towards the bottom.

In one aspect, particles having higher degrees of compressibility may be designed with a lower density. Similarly, particles having lower degrees of compressibility may be designed to have a higher density. In this way, all compressible particles may be pumped into the annular region together ahead of a cement slurry, with the understanding that the particles may at least partially re-settle themselves according to their respective densities. Density may be adjusted, for example, by increasing or decreasing porosity.

As a third option, the operator may choose to deliberately place particles within an annular region in stages. Particles with a lower density and a higher compressibility response may be pumped down first. This would be followed by particles with a slightly lower density and a slightly higher compressibility response. Particles having the highest density and the lowest compressibility response may be pumped down last, just ahead of the cement.

The method 800 further includes, optionally, designing particle density. This is seen at Box 840. Density of the compressible particles is selected in view of the carrier fluid used, and any weighting agent particles. Specifically, the density of the compressible particles should be selected to provide for buoyancy within the carrier fluid. The density of the carrier fluid is between 12.5 ppg and 15.5 ppg and the densities of the compressible particles span across this range. This helps ensure that the particles remain well-dispersed along the annular column.

As part of the step of Box 840, the operator may select a density range for the compressible particles. Ideally, the compressible particles may have a specific gravity ("SG") that is close to that of the carrier fluid. Preferably, the SG of the compressible particles may have a range of plus/minus 0.2 of the carrier fluid. This prevents particles from settling at the bottom or rising to the top of the narrow annulus in the annular region, forming a bed that isolates the annulus (or at least many of the particles) from pressure.

In one embodiment, each of the particles has a density that is lower than a density of the carrier fluid such that a majority of the compressible particles are suspended in an upper half of the fluid column. Alternatively, each of the particles has a density that is higher than a density of the carrier fluid. Preferably though, the density may be within a range of plus/minus 0.2 of the carrier fluid.

In some instances, the presence of the weighting agent particles is beneficial, particularly for compressible particles that have lower compressibility. In this case it is desirable for the particles to settle lower along the carrier fluid in the column. A weighting agent may help keep the particles within the desired range of depth for maximum compressibility as discussed above in connection with FIG. 7B, that is, between Depths 1 and 2.

In one aspect, the compressible particles comprise first compressible particles having a first density, and second compressible particles having a second density. Each of the compressible particles has a density that is between 12.5 ppg and 15.5 ppg, enabling a degree of buoyancy within the annulus. The first compressible particles generally rise towards an upper half of the fluid column after pumping, while the second compressible particles generally settle towards a lower half of the annulus after pumping.

Where the carrier fluid is a drilling mud, the compressible particles may come into contact with weighting agent particles. This can take place during a step of blending the compressible particles into the carrier fluid. This is shown in Box 845. In this way, a fluid mixture is formed.

Preferably, the compressible particles are mixed into the carrier fluid at a concentration of 5% to 40% by volume. The greater the concentration of particles there is, the greater the overall compressibility of the fluid column in the annular region. Thus, overall compressibility is impacted not only by the degree of compressibility of the particles along the column in the annular region, but also by the number of particles provided.

In connection with the mixing step of Box 855, the operator may choose to add additives to the mixture in order to increase the rheological properties (e.g., plastic viscosity, yield point value, and gel strength) of the mixture. Such additives may include one or more natural and/or synthetic polymeric additives, polymeric thinners, or flocculants. The purpose of such additives is to alter the gel strength of the fluid to inhibit particle settling.

Particles making up the weighting agent may have a diameter that is substantially similar to a diameter of the compressible particles. Alternatively, particles making up the weighting agent have a diameter that is at least 150 times smaller than a diameter of the compressible particles.

The compressible particles may range in size from 30 micrometers or microns (μm) to 1300 μm in diameter, depending on the specific particle size distribution. More preferably, the particle size distribution may be between 200 μm and 400 μm. In one aspect, the average size of each of the compressible particles is between 350 μm and 450 μm (in dry state). The preferred median diameter for the compressible carbon is 400 microns.

To improve the performance of the compressible particles, the carrier fluid may optionally be prepared such that the gas content is minimized. Thus, a step in Box 850 of de-gasifying the mixture may be provided for the method 800. In one aspect, this simply means agitating the fluid mixture.

The method 800 further includes pumping the fluid mixture into the annulus. This is provided in Box 855. The fluid mixture comprises a carrier fluid, and a plurality of compressible particles dispersed in the carrier fluid.

The carrier fluid is preferably pumped in ahead of the cement column. Alternatively, the carrier fluid may be pumped directly into the annular region through a reverse circulation valve, after the cement slurry has been placed below a first depth in the annulus. Stated another way, pumping the fluid mixture comprises pumping the fluid mixture down the annulus, through a reverse circulation sleeve residing along a second string of casing, and back up the second string of casing after the column of cement has set around the second string of casing. In any instance, a fluid column is formed.

As part of the step of Box 855, the operator may allow the column of cement to set around the second string of casing below the first depth.

In one embodiment, pumping the fluid mixture comprises pumping the fluid mixture with first compressible particles into the wellbore, and then pumping the fluid mixture with second compressible particles into the wellbore behind the mixture with the first compressible particles but in front of the cement. This places the mixture with the first compressible particles into the annulus at a position above the mixture with the second compressible particles. In this instance, the density of the fluid compressible particles in the fluid mixture is lower than the density of the second compressible particles.

In accordance with the present disclosure, the operator may at least partially seal the annular region along at least one depth above the column of cement. This is done through the use of two or more annular sealing mechanisms placed along a string of production casing adjacent a trapped annulus. This is discussed above in connection with Box. 665.

The method 800 further includes producing hydrocarbon fluids up the wellbore. This is shown in Box 860. During production, warm production fluids flow through a tubing string 160 up to the surface. These fluids raise the temperature inside the wellbore, including the fluids inside the one or more trapped annuli within the annular regions 132, 142, causing thermal expansion. This, in turn, increases the pressure within each trapped annulus.

In response to thermal expansion of the fluid mixture in the annulus, the method 800 then includes absorbing pressure chambers using the compressible particles. This is seen in Box 865. The carbonaceous particles within the fluid mixture are designed to absorb pressure in response to thermal expansion of wellbore fluids within the annular region.

The present techniques may also include providing certain enhancements for the compressible particles. Compressible carbon having a low thermal coefficient of expansion and high compressibility may be used. The compressibility provides the drilling mud (or other carrier fluid) additional volume (on a relative per unit volume basis) to expand into upon being heated. The compressibility of the carbon particles may be enhanced by a closed porosity that is sealed to fluid ingress.

Additional porosity exists on the surfaces of the particles that is open to fluid ingress. These may be referred to as open pores. Upon pressuring the carbon, the open and closed pores collapse, allowing the particles to shrink and provide volume for the fluid surrounding the particles to move into. Upon reducing the fluid pressure around the carbon, the particles rebound into their original shape, while keeping the closed porosity dry.

Figure 10A:
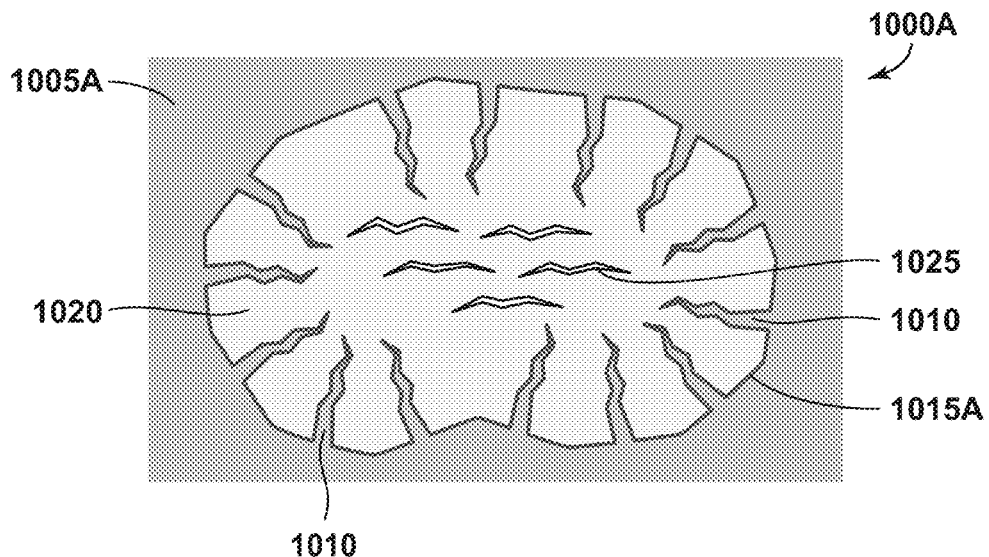
FIGS. 10A and 10B are top views of illustrative carbon particles. Here, the particles represent a solid material having a plurality of peripheral openings. The particles are at ambient conditions.
Figure 10B:
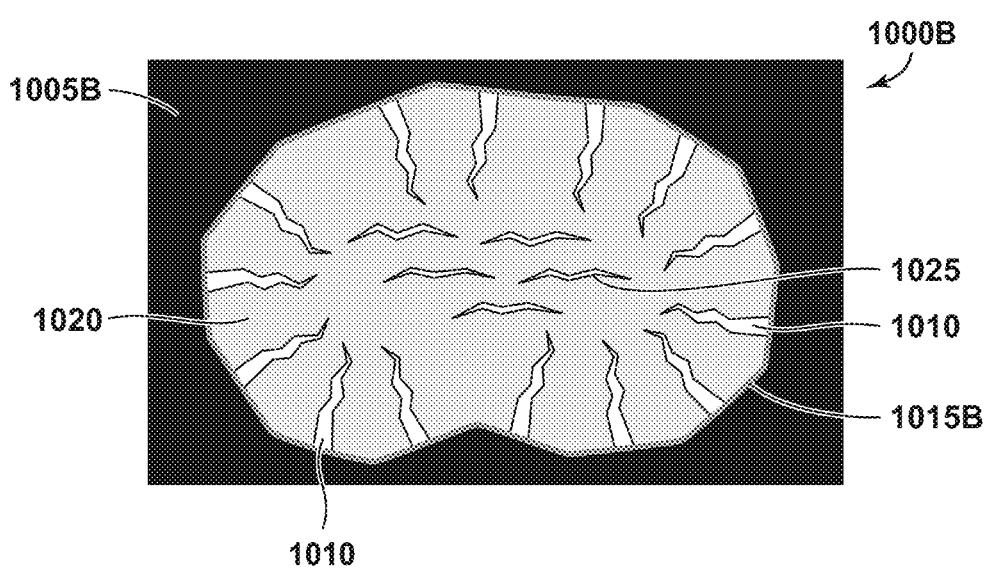

FIGS. 10A and 10B are top views of illustrative carbon particles. Here, the views depict a single, solid carbon particle having a plurality of openings. FIG. 10A shows a carbon particle 1000A suspended in a fluid 1005A. The fluid 1005A may be either brine or a non-aqueous fluid. The particle 1000A has an amorphous shape. The particle 1000A defines a body 1020 bounded by a peripheral surface 1015A. A plurality of openings 1010 reside around the peripheral surface 1015A. In addition, intragranular pores 1025 are present. The openings 1010 and the pore spaces 1025 provide for a porous carbon particle.

It is observed that the openings 1010 along the periphery 1015A are capable of receiving an ingress of wellbore fluids 1005A. In the view of FIG. 10A, the particle 1000A is experiencing what would be considered to be a usual pressure within the annular region of a wellbore. The pressure is governed primarily by the hydrostatic head of fluid residing within the annular region. One may refer to this as the ambient pressure. Wellbore fluids 1005A remain largely external to the particle 1000A until pressurization.

In FIG. 10A, the internal porosity 1025 remains sealed and free of fluid ingress under pressure. The open porosity 1025 is in communication with the particle's external environment and remains free to fluid imbibition under pressure. This is consistent with FIG. 5A. As pressure increases (as shown in FIG. 5B), the particle 1000A may experience compression, or strain. However, there is concern that fluid invading the peripheral openings 1010 and possibly pore spaces 1025 may limit the extent of compressibility.

It is believed that the compressibility of the particles may be enhanced if the particles are embedded in a rubber or coated in an impermeable resin or polymeric coating. When carbon is embedded in a rubber, such as an nitrile butadiene rubber (NBR), hydrogenated nitrile butadiene rubber (HNBR), or fluoroelastomer (such as FKM) or other polymer that forms a tightly packed, impermeable chain network, both closed and open pore spaces remain free of fluid ingress under hydraulic pressurization. This means that the particle remains liquid-sealed. Because the sealed porosity is increased when carbon is placed into the polymer, additional pore volume exists that collapses when the pressure around the particles is increased. In other words, surrounding the particles with an impermeable polymeric coating makes the external pore space useful; the coating or thin sheet is a means of maximizing the efficacy of the particles' pore spaces 1010, 1025 and thus maximizing the compressibility.

FIG. 10B shows another carbon particle 1000B. Here, the carbon particle 1000B is represented as being embedded within a polymeric rubber matrix 1005B, such as NBR, HNBR, or FKM The matrix may be, for example, a thin sheet. The carbon particle 1000B has an amorphous shape and is shown at ambient conditions. The carbon particle 1000B defines a body 1020 bounded by a peripheral surface 1015B. A plurality of openings 1010 reside around the peripheral surface 1015B. In addition, intragranular pores 1025 are again present.

Beneficially, preserving the open pore spaces 1010, 1025 maintains buoyancy of the compressible particle 1000B. In one implementation, compressible coke particle are embedded in an incompressible rubber (polymeric rubber matrix 1005B) to eliminate particles settling in an annular region after placement. During production, transmission of fluid stress is effected onto the particles 1000B through the rubber matrix 1005B.

Figure 11:
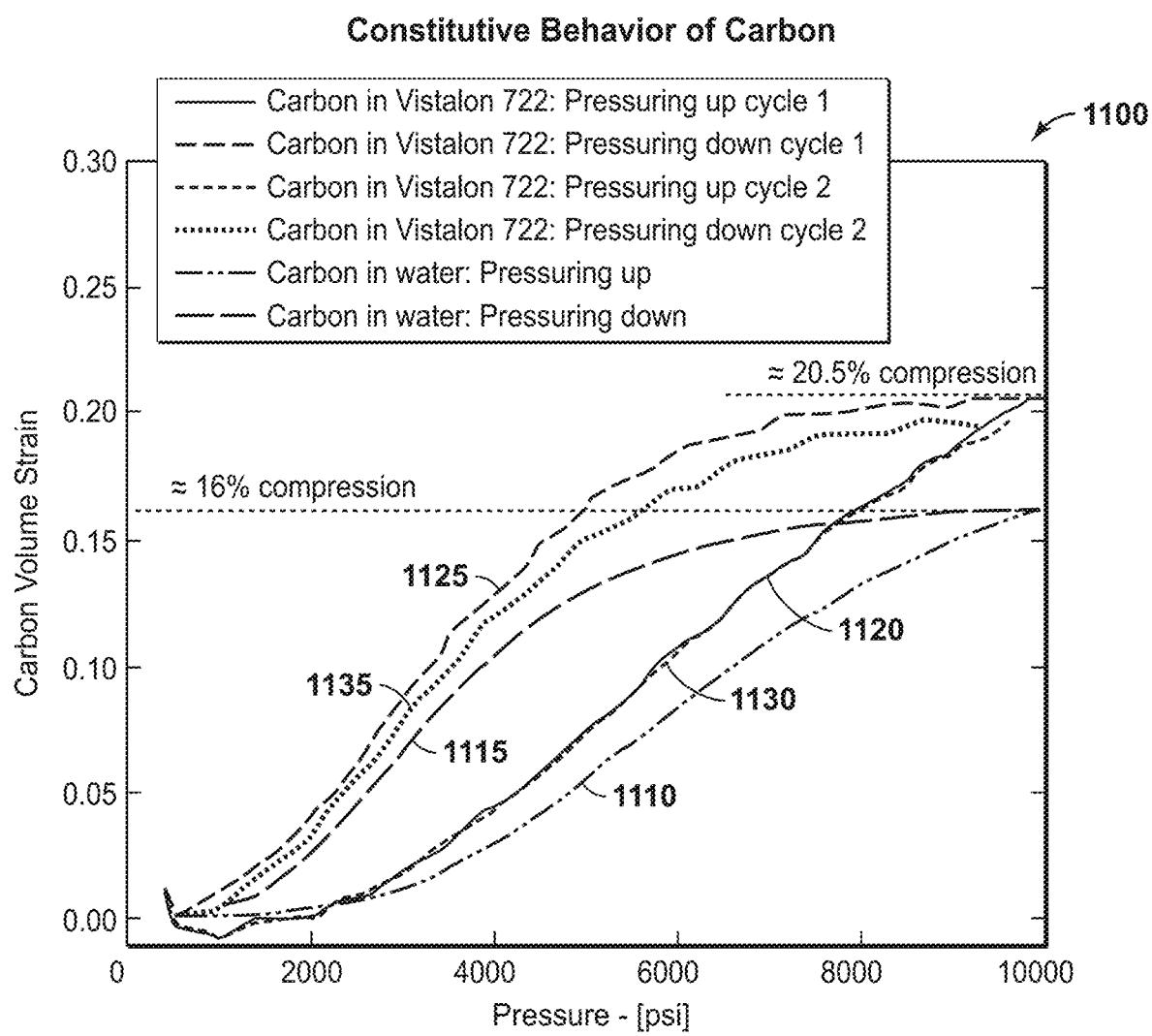
FIG. 11 is a Cartesian coordinate showing carbon volume strain (along the y-axis) as a function pressure (along the x-axis). Carbon particles with and without a rubber coating are tested to measure compressibility.

FIG. 11 provides a Cartesian coordinate 1100 showing volume strain (along the y-axis) as a function pressure (along the x-axis). Stated another way, FIG. 11 presents a chart of experimentally recorded volume strain experienced by carbon particles as a function of applied hydraulic pressure. Pressure is presented in units of psi, ranging from 500 psi up to 10,000 psi.

Two different types of carbon particles were tested for compressibility—particles without a polymeric coating, and then particles with a polymeric coating. The coating applied in this test was an ethylene propylene diene monomer rubber (or EPDM synthetic rubber). Specifically, Vistalon™ 722 produced by ExxonMobil Chemical Company in Baytown, Texas was used as the coating.

Line 1110 shows carbon particles in water during a Pressuring Up (or compression) cycle. These particles did not have the polymeric coating. Carbon particles were mixed into a fluid slurry and then placed into a pressure vessel of known volume.

Line 1115 shows the same carbon particles during a Pressuring Down (or decompression) cycle. Here, carbon particles were embedded in a rubber sheet approximately 5"×5"×0.1" in size. The sheet was then lowered into the water packed vessel and held under pressure for a period of days. This ensured saturation of all fluid-accessible pore spaces in the polymer.

Line 1120 shows carbon particles coated in Vistalon™ during a first Pressure Up cycle. Line 1125 shows the same carbon particles during the ensuing Pressure Down cycle. Line 1130 shows the carbon particles coated in Vistalon™ during a second Pressure Up cycle. Line 1135 shows the carbon particles during the second Pressure Down cycle. The tests show enhanced compressibility of the particles when coated with the polymeric material. Greater compressibility is achieved for the coated particles at lower pressures.

It is noted that "coating" of the compressible carbon particles 1000B may mean placing the particles 1000B into a polymeric rubber matrix 1005B). Thus, the polymeric rubber matrix 1005B may represent a matrix in the form of a sheet, as opposed to a liquid slurry of coated particles.

FIG. 11 demonstrates that when pressuring the systems from 500 psi to 10,000 psi, carbon particles that were suspended in water strained by approximately 16% of their original volume, while particles that were embedded in EPR strained by approximately 20.5% of their original volume. In both cases, the original (un-pressurized) carbon volume was calculated using the particles' Helium density (as measured by Helium pycnometry)—that is, the results were normalized on a per-gram-of-carbon basis.

Figure 12:
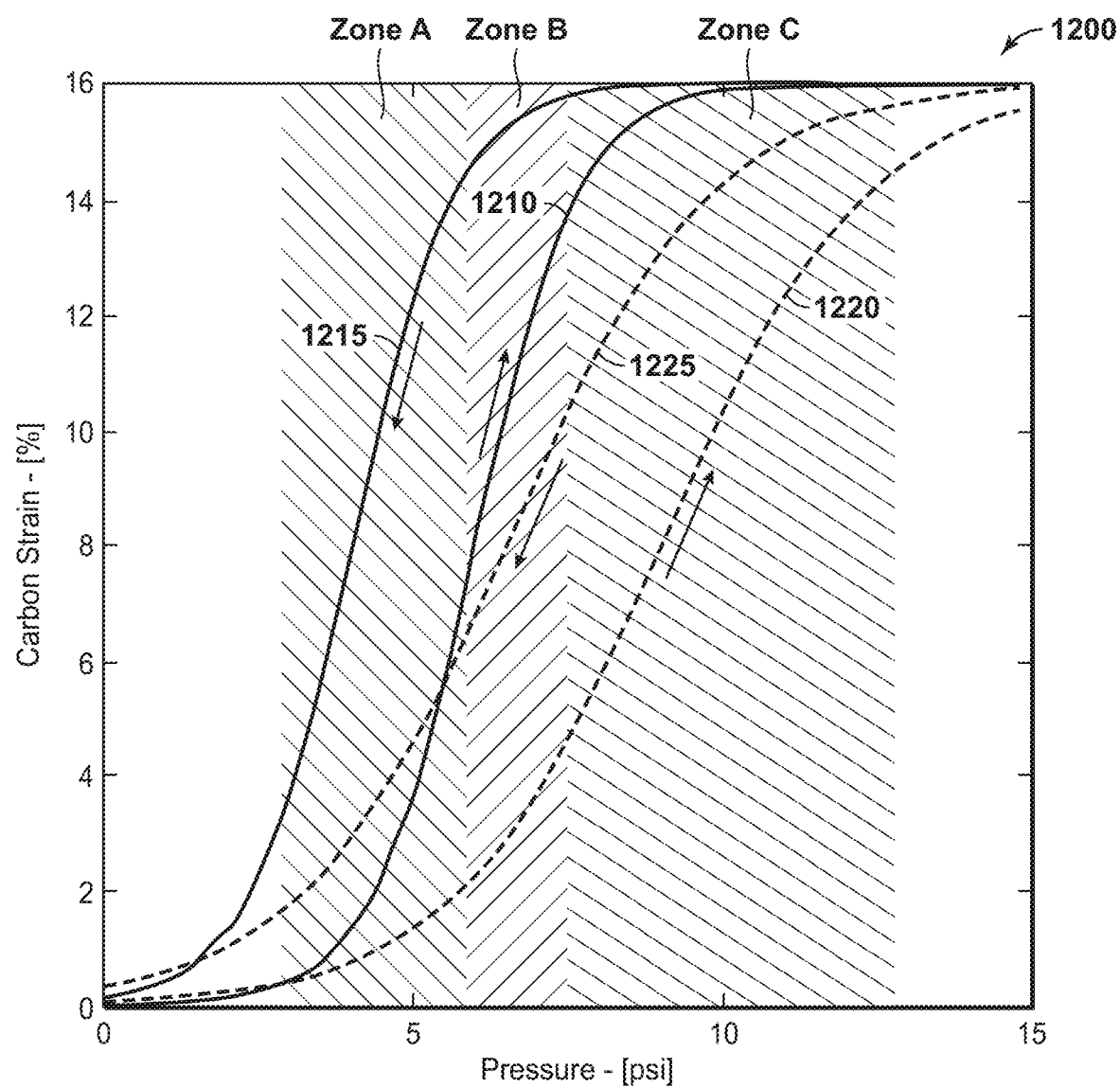
FIG. 12 is a diagram presenting a charting of strain versus pressure for carbon particles.

FIG. 12 provides a diagram 1200 showing strain versus pressure on carbon particles. Strain is shown on the y-axis and is measured in percentage, meaning percentage of compression in response to ambient conditions. Pressure is shown on the x-axis, and is indicated in units of pounds per square inch ("PSI").

Four lines are indicated in FIG. 12. The two solid lines 1210, 1215 demonstrate the compression and decompression curves of carbon particles when suspended in a fluid. Line 1210 shows a pressuring up cycle, while line 1215 shows pressuring down cycle.

The dashed lines show the envisioned compression and decompression curves of the particles when the carbon is coated in a stiff resin or embedded in a stiff rubber matrix, such as shown at polymeric rubber matrix 1005B in FIG. 10B. Line 1220 shows a compression cycle, while line 1225 shows a decompression cycle.

Shading is provided in the diagram 1200. The shading delineates the pressure ranges over which the suspended (FIG. 10A) and coated/embedded (FIG. 10B) carbon particles demonstrate the majority of their usable compressibility, respectively. The ability to extend the range over which the carbon particles compress enables performance of the particles in deeper wells, where higher hydrostatic pressures prevail.

In many well applications, it may be advantageous to shift the useable pressure range to improve particle performance under the hydrostatic pressures predicted downhole. It is proposed that the stiffness of the coating or rubber within which the particles are embedded can be chosen to achieve a preferred shift/extension of the useable pressure range. Thus, in one aspect, the elastomeric or rubber coating into which the particles are placed is engineered to allow the particles to compress over a desired pressure range.

In FIG. 12, Zone A indicates a first pressure range. Zone B indicates a second pressure range. Zone C represents still a third pressure range. It is observed that the non-coated particles exhibit a large majority of their compressibility within the lowest pressure range, to wit, Zone A. In contrast, the coated particles exhibit compressibility across all three pressure ranges, to wit, Zones A, B and C.

Carbon particles without an elastomeric coating exhibit large compressibility between 3,000 psi and 9,000 psi, but above 9,000 psi, the particles' compressibility decreases. The stiffness of the coating or rubber can be engineered to support some of the stress being enacted by the fluid pressure onto the particles. This shifts or extends the pressure range over which the carbon particles significantly compress. Thus, with the elastomeric coating the particles exhibit continued compressibility even beyond 10,000 psi.

In support of the method of placing a fluid mixture having compressible particles into a wellbore, and in support of the methods of attenuating annular pressure building as described herein, various embodiments may be provided. The present techniques may be susceptible to various modifications and alternative forms, such as the following embodiments as noted in paragraphs 1A to 22A:

1A. A method of attenuating annular pressure buildup within a wellbore, comprising: accessing a wellbore, the wellbore comprising: a first string of casing extending into a subsurface to a first depth; and a second string of casing extending into the subsurface to a second depth that is greater than the first depth, wherein the first string of casing surrounds an upper portion of the second string of casing, forming an annular region; pumping a fluid mixture into the annular region, forming a fluid column, wherein the fluid mixture comprises: a carrier fluid; and a plurality of compressible particles dispersed in the carrier fluid, wherein each of the compressible particles is fabricated to partially collapse in response to thermal expansion of fluid within the annular region during the production of hydrocarbon fluids; and at least partially sealing the annular region along at least one depth above the first depth, thereby inhibiting migration of the compressible particles along the annular region.

2A. The method of paragraph 1A, further comprising: placing a wellhead over the wellbore, thereby forming a trapped annulus in the wellbore; and wherein the fluid mixture resides within the trapped annulus.

3A. The method of paragraph 2A, further comprising: pumping a column of cement into the annular region; and allowing the column of cement to set around the second string of casing below the first depth, wherein the fluid mixture resides above the column of cement.

4A. The method of any of paragraphs 1A to 3A, wherein each of the plurality of compressible particles comprises carbon fibers or carbon particles.

5A. The method of paragraph 4A, wherein: the carrier fluid comprises drilling fluid; and the fluid mixture further comprises weighting agent particles as part of the drilling fluid.

6A. The method of paragraph 4A, wherein: particles making up the weighting agent have a diameter that is substantially similar to a diameter of the compressible particles.

7A. The method of paragraph 4A, wherein: each of the plurality of compressible particles comprises a carbon particle; and each of the carbon particles is coated with a polymeric rubber material.

8A. The method of paragraph 4A, wherein: the compressible particles together have a reversible volumetric expansion/contraction of greater than or equal to ($\geq$) 3% at pressures of at least 6,000 psi (or at pressures between 15 psi and at least 6,000 psi or when subjected to a hydrostatic fluid pressure between atmospheric pressure (15 psi) to 6,000 psi); and the carrier fluid is brine or a thixotropic fluid.

9A. The method of any of paragraphs 1A to 8A, wherein at least partially sealing the annular region comprises: placing at least one packer in series along the second string of casing; and actuating each of the at least one packer.

10A. The method of paragraph 9A, wherein actuating each of the at least one packer operates to completely seal off the annular region.

11A. The method of paragraph 2A, wherein: the carrier fluid is brine, an aqueous drilling fluid or a non-aqueous drilling fluid; and each of the compressible particles has a specific gravity that is 1.5 to 2.0 times that of the carrier fluid.

12A. The method of any of paragraphs 1A to 11A, further comprising: blending the compressible particles into the carrier fluid at a surface to form the fluid mixture, before pumping the fluid mixture into the annulus; and producing hydrocarbon fluids from the wellbore; and wherein at least partially sealing the annular region comprises actuating a plurality of annular sealing devices.

13A. The method of paragraph 12A, wherein: the compressible particles comprise first compressible particles having a first density, and second compressible particles having a second density, wherein the first compressible particles are biased to rise in the trapped annulus after pumping, while the second compressible particles are biased to sink in the trapped annulus after pumping.

14A. A method of placing compressible particles within a wellbore, comprising: running a first string of casing into a wellbore, the first string of casing extending into a subsurface to a first depth; running a second string of casing into the wellbore, the second string of casing extending into the subsurface to a depth that is greater than the first depth, and wherein the first string of casing surrounds an upper portion of the second string of casing forming an annular region; pumping a fluid mixture into the annular region, forming a fluid column, wherein the fluid mixture comprises: a carrier fluid; and a plurality of compressible particles dispersed in the carrier fluid; at least partially sealing the annular region along at least one depth above the first depth; placing a column of cement around the second string of casing below the first depth; and placing a wellhead over the wellbore, thereby forming a trapped annulus in the wellbore over the annular region; and wherein: the compressible particles comprises a plurality of carbonaceous particles, and the carbonaceous particles are designed to absorb pressure in response to thermal expansion of wellbore fluids within the annular region during the production of hydrocarbon fluids from the wellbore.

15A. The method of paragraph 14A, further comprising: pumping a column of cement into the annular region; allowing the column of cement to set around the second string of casing below the first depth, wherein the fluid mixture resides above the column of cement.

16A. The method of paragraph 15A, wherein: the fluid mixture is pumped into the wellbore after the column of cement has been placed around the second string of casing; and pumping the fluid mixture comprises pumping the fluid mixture down the annulus, through a reverse circulation sleeve residing along the second string of casing, and back up the second string of casing after the column of cement has set around the second string of casing.

17A. The method of paragraph 15A, wherein: a specific gravity of each of the compressible particles is within plus/minus 0.2 of a specific gravity of the carrier fluid; and each of the compressible particles comprises carbon fibers or carbon particles.

18A. The method of any of paragraphs 15A to 17A, wherein: the carrier fluid comprises drilling fluid; and the fluid mixture further comprises weighting agent particles as part of the drilling fluid.

19A. The method of any of paragraphs 15A to 18A, wherein at least partially sealing the annular region comprises: placing at least one packer in series along the second string of casing; and actuating each of the at least one packer in order to fully seal off the annular region.

20A. The method of any of paragraphs 15A to 17A, wherein: the compressible particles together have a reversible volumetric expansion/contraction of ≥3% at pressures of at least 6,000 psi or at pressures between 15 psi and at least 6,000 psi or when subjected to a hydrostatic fluid pressure between atmospheric pressure (15 psi) to 6,000 psi; the carrier fluid is brine, an aqueous drilling fluid or a non-aqueous drilling fluid; each of the compressible particles has a specific gravity that is 1.5 to 2.0 times that of the carrier fluid; and the method further comprises: blending the compressible particles into the carrier fluid at a surface to form the fluid mixture, before pumping the fluid mixture into the annulus; and producing hydrocarbon fluids from the wellbore.

21A. The method of paragraph 15A, wherein: each of the compressible particles comprises carbon fibers or carbon particles; and each of the carbon fibers is coated with a polymeric rubber material.

22A. A wellbore having a trapped annulus, comprising: a first string of casing extending into a subsurface to a first depth; a second string of casing extending into the subsurface to a depth that is greater than the first depth, and wherein the first string of casing surrounds an upper portion of the second string of casing forming an annular region; a column of cement residing around the second string of casing below the first depth; a wellhead placed over the wellbore, forming a trapped annulus in the wellbore over the annular region; at least one barrier mechanism placed in series along the second string of casing to a least partially seal the annular region along the column of cement; a fluid mixture residing within the trapped annulus comprising: a carrier fluid; and a plurality of compressible, carbonaceous particles dispersed in the carrier fluid, wherein the carbonaceous particles are designed to absorb pressure in response to thermal expansion of wellbore fluids within the annular region during the production of hydrocarbon fluids from the wellbore; and wherein the at least one barrier mechanism inhibits migration of the compressible particles along the annular region.

In addition to paragraphs 1A to 22A. The present techniques may be susceptible to various modifications and alternative forms, such as the following embodiments as noted in paragraphs 1B to 49B:

1B. A method of attenuating annular pressure buildup within a wellbore, comprising: accessing a wellbore, the wellbore comprising: a first string of casing extending into a subsurface to a first depth; and a second string of casing extending into the subsurface to a second depth that is greater than the first depth, wherein the first string of casing surrounds an upper portion of the second string of casing, forming an annular region; pumping a fluid mixture into the annular region, forming a fluid column, wherein the fluid mixture comprises: a carrier fluid; and a plurality of compressible particles dispersed in the carrier fluid, wherein each of the compressible particles is fabricated to partially collapse in response to thermal expansion of fluid within the annular region during the production of hydrocarbon fluids; and at least partially sealing the annular region along at least one depth above the first depth, thereby inhibiting migration of the compressible particles along the annular region.

2B. The method of paragraph 1B, further comprising: placing a wellhead over the wellbore, thereby forming a trapped annulus in the wellbore; and wherein the fluid mixture resides within the trapped annulus.

3B. The method of paragraph 2B, further comprising: pumping a column of cement into the annular region; and allowing the column of cement to set around the second string of casing below the first depth, wherein the fluid mixture resides above the column of cement.

4B. The method of paragraph 2B, wherein the compressible particles together have a reversible volumetric contraction of greater than or equal to (≥) 3% when the fluid pressure acting on the particles is increased from 15 pounds per square inch (psi) to 6,000 psi.

5B. The method of paragraph 2B, wherein each of the plurality of compressible particles comprises carbon fibers or carbon particles.

6B. The method of paragraph 5B, wherein: the carrier fluid comprises drilling fluid; and the fluid mixture further comprises weighting agent particles as part of the drilling fluid.

7B. The method of paragraph 6B, wherein: the drilling fluid is an aqueous drilling fluid; and the weighting agent particles comprises barite, hematite, ilmenite, or combinations thereof.

8B. The method of paragraph 7B, wherein the weighting agent particles each have a particle size that is at least 150 times smaller than a size of the compressible particles.

9B. The method of paragraph 5B, wherein: each of the plurality of compressible particles comprises carbon particles; and each of the carbon particles is coated with a polymeric rubber material.

10B. The method of paragraph 9B, wherein: the carrier fluid is brine or a thixotropic fluid; and the polymeric rubber material is ethylene propylene rubber or one or more of hydrogenated nitrile butadiene rubber (HNBR), nitrile butadiene rubber (NBR), and fluoroelastomer (FKM).

11B. The method of paragraph 2B, wherein at least partially sealing the annular region along at least one depth above the column of cement comprises: placing at least one packer in series along the second string of casing; and actuating each of the at least one packer.

12B. The method of paragraph 11B, wherein actuating each of the at least one packer operates to completely seal off the annular region.

13B. The method of paragraph 12B, wherein a density of a majority of each of the compressible particles is greater than a density of the carrier fluid such that the compressible particles are biased to sink in the trapped annulus towards the packers.

14B. The method of paragraph 12B, wherein a density of a majority of each of the compressible particles is less than a density of the carrier fluid such that the compressible particles are biased to rise in the trapped annulus towards the packers.

15B. The method of paragraph 2B, wherein at least partially sealing the annular region along at least one depth above the column of cement comprises: securing at least one sealing joint in series along the second string of casing, wherein each of the at least one sealing joint comprises cups.

16B. The method of paragraph 15B, wherein: the at least one sealing joint comprises at least two sealing joints; and each of the cups is upwardly concave, downwardly concave, or some cups are upwardly concave while others are downwardly concave.

17B. The method of paragraph 15B, wherein: at least some of the compressible particles have a density that is less than a density of the carrier fluid such that the compressible particles are biased to rise in the trapped annulus; and the cups are downwardly concave.

18B. The method of paragraph 15B, wherein: at least some of the compressible particles have a density that is greater than a density of the carrier fluid such that the compressible particles are biased to sink in the trapped annulus; and the cups are upwardly concave.

19B. The method of paragraph 2B, wherein: the carrier fluid is brine, an aqueous drilling fluid or a non-aqueous drilling fluid; and each of the plurality of compressible particles comprises carbon particles; each of the compressible particles has a specific gravity that is 1.5 to 2.0 times that of the carrier fluid; and each of the carbon particles is coated with a polymeric rubber material.

20B. The method of paragraph 2B, wherein the compressible particles have outer diameters that are between 40 micrometers (μm) and 1300 μm (in dry state).

21B. The method of paragraph 20B, wherein at least 50% of the compressible particles have a range of outer diameter that is between 100 μm and 600 μm.

22B. The method of paragraph 2B, further comprising: blending the compressible particles into the carrier fluid at a surface to form the fluid mixture, before pumping the fluid mixture into the annulus; and wherein at least partially sealing the annular region comprises actuating a plurality of annular sealing devices.

23B. The method of paragraph 22B, wherein: the compressible particles comprise first compressible particles having a first density, and second compressible particles having a second density; each of the compressible particles has a density at ambient conditions that is between 12.5 pounds per gallon (ppg) and 15.5 ppg; and wherein the first compressible particles are biased to rise in the trapped annulus after pumping, while the second compressible particles are biased to sink in the trapped annulus after pumping.

24B. The method of paragraph 2B, further comprising: producing hydrocarbon fluids from the wellbore.

25B. A method of placing compressible particles within a wellbore, comprising: running a first string of casing into a wellbore, the first string of casing extending into a subsurface to a first depth; running a second string of casing into the wellbore, the second string of casing extending into the subsurface to a depth that is greater than the first depth, and wherein the first string of casing surrounds an upper portion of the second string of casing forming an annular region; pumping a fluid mixture into the annular region, forming a fluid column, wherein the fluid mixture comprises: a carrier fluid; and a plurality of compressible particles dispersed in the carrier fluid; at least partially sealing the annular region along at least one depth above the first depth; placing a column of cement around the second string of casing below the first depth; and placing a wellhead over the wellbore, thereby forming a trapped annulus in the wellbore over the annular region; and wherein: the compressible particles comprises a plurality of carbonaceous particles, and the carbonaceous particles are designed to absorb pressure in response to thermal expansion of wellbore fluids within the annular region during the production of hydrocarbon fluids from the wellbore.

26B. The method of paragraph 25B, further comprising: pumping a column of cement into the annular region; allowing the column of cement to set around the second string of casing below the first depth, wherein the fluid mixture resides above the column of cement.

27B. The method of paragraph 25B, wherein: the carbonaceous particles are designed to have an optimum pressure performance at an upper end of the range of expected pressures within the trapped annulus during production; and each of the plurality of compressible particles has a reversible volumetric expansion/contraction of greater than or equal to (≥) 3% at pressures of at least 6,000 pounds per square inch (psi) or at pressures between 15 psi and at least 6,000 psi or when subjected to a hydrostatic fluid pressure between atmospheric pressure (15 psi) to 6,000 psi.

28B. The method of paragraph 27B, wherein: the fluid mixture is pumped into the wellbore after the column of cement has been placed around the second string of casing; and pumping the fluid mixture comprises pumping the fluid mixture down the annulus, through a reverse circulation sleeve residing along the second string of casing, and back up the second string of casing after the column of cement has set around the second string of casing.

29B. The method of paragraph 27B, wherein: a specific gravity of each of the compressible particles is within plus/minus 0.2 of a specific gravity of the carrier fluid; and each of the compressible particles comprises carbon fibers or carbon particles.

30B. The method of paragraph 25B, wherein: the carrier fluid comprises drilling fluid; and the fluid mixture further comprises weighting agent particles as part of the drilling fluid.

31B. The method of paragraph 25B, wherein at least partially sealing the annular region comprises: placing at least one packer in series along the second string of casing; and actuating each of the at least one packer in order to fully seal off the annular region.

32B. The method of paragraph 25B, wherein at least partially sealing the annular region comprises; securing at least one sealing joint in series along the second string of casing, wherein each of the at least one sealing joint comprises concave cups.

33B. The method of paragraph 32B, wherein: the at least one sealing joint comprises at least two sealing joints; and each of the cups is upwardly concave, downwardly concave, or some cups are upwardly concave while others are downwardly concave.

34B. The method of paragraph 25B, wherein: the carrier fluid is brine, an aqueous drilling fluid or a non-aqueous drilling fluid; each of the compressible particles has a specific gravity that is 1.5 to 2.0 times that of the carrier fluid; and
the method further comprises blending the compressible particles into the carrier fluid at a surface to form the fluid mixture, before pumping the fluid mixture into the annulus.

35B. The method of paragraph 34B, further comprising: producing hydrocarbon fluids from the wellbore.

36B. The method of paragraph 34B, further comprising: determining a maximum pressure for effectiveness of the compressible particles; and ensuring that during the pumping of the fluid mixture the compressible particles are not exposed to a hydrostatic pressure of fluids in the wellbore that exceeds the maximum pressure.

37B. The method of paragraph 34B, further comprising: determining a range of pressures expected to be experienced by the fluid mixture in the annulus; and designing the compressible particles to have an optimum pressure performance at an upper end of the range of expected pressures.

38B. The method of paragraph 25B, wherein each of the carbon particles is coated with a polymeric rubber material.

39B. A wellbore having a trapped annulus, comprising: a first string of casing extending into a subsurface to a first depth; a second string of casing extending into the subsurface to a depth that is greater than the first depth, and wherein the first string of casing surrounds an upper portion of the second string of casing forming an annular region; a column of cement residing around the second string of casing below the first depth; a wellhead placed over the wellbore, forming a trapped annulus in the wellbore over the annular region; at least one barrier mechanism placed in series along the second string of casing to a least partially seal the annular region along the column of cement; a fluid mixture residing within the trapped annulus comprising: a carrier fluid; and a plurality of compressible, carbonaceous particles dispersed in the carrier fluid, wherein the carbonaceous particles are designed to absorb pressure in response to thermal expansion of wellbore fluids within the annular region during the production of hydrocarbon fluids from the wellbore.

40B. The wellbore of paragraph 39B, wherein each of the plurality of compressible particles comprises calcined petroleum coke and sulfur.

41B. The wellbore of paragraph 39B, wherein each of the carbon particles is coated with a polymeric rubber material.

42B. The wellbore of paragraph 41B, wherein the plurality of compressible particles together have a reversible volumetric expansion/contraction of greater than or equal to ($\geq$) 3% at pressures of at least 6,000 pounds per square inch (psi).

43B. The wellbore of paragraph 39B, wherein: the at least one barrier mechanism comprises a plurality of packers; each of the plurality of packers comprises a sealing element; and each of the plurality of packers is configured to be actuated such that the sealing element engages an inner diameter of the first string of casing.

44B. The wellbore of paragraph 43B, wherein a density of a majority of each of the compressible particles is greater than a density of the carrier fluid such that the compressible particles are biased to sink in the trapped annulus towards the packers.

45B. The wellbore of paragraph 43B, wherein a density of a majority of each of the compressible particles is less than a density of the carrier fluid such that the compressible particles are biased to rise in the trapped annulus towards the packers.

46B. The wellbore of paragraph 39B, wherein the at least one barrier mechanism comprises a plurality of cups spaced apart along the second string of casing.

47B. The wellbore of paragraph 46B, wherein the cups are upwardly concave, downwardly concave, or some cups are upwardly concave while others are downwardly concave.

48B. The wellbore of paragraph 39B, wherein: at least some of the compressible particles have a density that is less than a density of the carrier fluid such that the compressible particles are biased to rise in the trapped annulus; and the cups are downwardly concave.

49B. The method of paragraph 39B wherein: at least some of the compressible particles have a density that is greater than a density of the carrier fluid such that the compressible particles are biased to sink in the trapped annulus; and the cups are upwardly concave.

Further variations of the method of designing compressible particles within a trapped annulus herein may fall within the spirit of the claims, below. It will be appreciated that the inventions are susceptible to modification, variation and change without departing from the spirit thereof.

We claim:

1. A method of attenuating annular pressure buildup within a wellbore, comprising:
accessing a wellbore, the wellbore comprising:
a first string of casing extending into a subsurface to a first depth; and
a second string of casing extending into the subsurface to a second depth that is greater than the first depth, wherein the first string of casing surrounds an upper portion of the second string of casing, forming an annular region;
pumping a fluid mixture into the annular region, forming a fluid column, wherein the fluid mixture comprises:
a carrier fluid; and
a plurality of compressible particles dispersed in the carrier fluid, wherein each of the compressible particles is fabricated to partially collapse in response to thermal expansion of fluid within the annular region during a production of hydrocarbon fluids, wherein at least some of the compressible particles have a density that is less than a density of the carrier fluid such that the compressible particles are biased to rise in the annular region; and
at least partially sealing the annular region along at least one depth above the first depth, thereby inhibiting migration of the compressible particles along the annular region, wherein at least partially sealing the annular region along at least one depth comprises securing at least one sealing joint in series along the second string of casing, wherein each of the at least one sealing joint comprises cups that are concave.

2. The method of claim 1, further comprising:
pumping a column of cement into the annular region; and
allowing the column of cement to set around the second string of casing below the first depth, wherein the fluid mixture resides above the column of cement; and
wherein the compressible particles together have a reversible volumetric contraction of within the range of 10 to 25% when the fluid pressure acting on the particles is increased from 15 pounds per square inch (psi) to 10,000 psi.

3. The method of claim 1, wherein each of the plurality of compressible particles comprises carbon fibers or carbon particles.

4. The method of claim 3, wherein:
the carrier fluid comprises drilling fluid;
the fluid mixture further comprises weighting agent particles as part of the drilling fluid; and wherein the weighting agent particles each have a particle size that is about, but not less than, 150 times smaller than a size of the compressible particles.

5. The method of claim 3, wherein:
each of the plurality of compressible particles comprises carbon particles; and
each of the carbon particles is coated with a polymeric rubber material.

6. The method of claim 5, wherein:
the carrier fluid is brine or a thixotropic fluid; and
the polymeric rubber material is one or more of ethylene propylene rubber, hydrogenated nitrile butadiene rubber (HNBR), nitrile butadiene rubber (NBR), and fluoroelastomer (FKM).

7. The method of claim 1, wherein:
the at least one sealing joint comprises at least two sealing joints; and
each of the cups is upwardly concave, downwardly concave, or some cups are upwardly concave while others are downwardly concave.

8. The method of claim 1, wherein:
the carrier fluid is brine, an aqueous drilling fluid or a non-aqueous drilling fluid; and
each of the plurality of compressible particles comprises carbon particles;
at least some of the compressible particles have a specific gravity that is 1.5 to 2.0 times that of the carrier fluid; and
each of the carbon particles is coated with a polymeric rubber material.

9. The method of claim 1, wherein the compressible particles have outer diameters that are between 40 micrometers ($\mu m$) and 1300 $\mu m$ (in dry state).

10. The method of claim 1, further comprising:
blending the compressible particles into the carrier fluid at a surface to form the fluid mixture, before pumping the fluid mixture into the annulus;
and wherein at least partially sealing the annular region comprises actuating a plurality of annular sealing devices.

11. The method of claim 10, wherein:
the compressible particles comprise first compressible particles having a first density, and second compressible particles having a second density;
each of the compressible particles has a density at ambient conditions that is between 12.5 pounds per gallon (ppg) and 15.5 ppg; and
wherein the first compressible particles are biased to rise in the annular region after pumping, while the second compressible particles are biased to sink in the annular region after pumping.

12. A method of placing compressible particles within a wellbore, comprising:
running a first string of casing into a wellbore, the first string of casing extending into a subsurface to a first depth;
running a second string of casing into the wellbore, the second string of casing extending into the subsurface to a depth that is greater than the first depth, and wherein the first string of casing surrounds an upper portion of the second string of casing forming an annular region;
pumping a fluid mixture into the annular region, forming a fluid column, wherein the fluid mixture comprises:
a carrier fluid; and
a plurality of compressible particles dispersed in the carrier fluid;
at least partially sealing the annular region along at least one depth above the first depth, wherein at least partially sealing the annular region along at least one depth comprises securing at least one sealing joint in series along the second string of casing, wherein each of the at least one sealing joint comprises cups that are concave;
placing a column of cement around the second string of casing below the first depth; and
placing a wellhead over the wellbore, thereby forming a trapped annulus in the wellbore over the annular region, wherein at least some of the compressible particles have a density that is less than a density of the carrier fluid such that the compressible particles are biased to rise in the trapped annulus;
and wherein:
the compressible particles comprises a plurality of carbonaceous particles, and
the carbonaceous particles are designed to absorb pressure in response to thermal expansion of wellbore fluids within the annular region during a production of hydrocarbon fluids from the wellbore.

13. The method of claim 12, further comprising:
pumping a column of cement into the annular region;
allowing the column of cement to set around the second string of casing below the first depth, wherein the fluid mixture resides above the column of cement.

14. The method of claim 12, wherein:
the carbonaceous particles are designed to have an optimum pressure performance comprising a maximum reversible volumetric expansion/contraction percentage at an upper end of the range of expected pressures within the trapped annulus during production; and
each of the plurality of compressible particles has a reversible volumetric expansion/contraction of within the range of 10 to 25% at pressures between 15 pounds per square inch (psi) and 10,000 psi.

15. The method of claim 14, wherein:
the fluid mixture is pumped into the wellbore after the column of cement has been placed around the second string of casing; and
pumping the fluid mixture comprises pumping the fluid mixture down the annulus, through a reverse circulation sleeve residing along the second string of casing, and back up the second string of casing after the column of cement has set around the second string of casing.

16. The method of claim 14, wherein:
a specific gravity of at least some of the compressible particles is within plus/minus 0.2 of a specific gravity of the carrier fluid; and
each of the compressible particles comprises carbon fibers or carbon particles.

17. The method of claim 12, wherein:
the carrier fluid is brine, an aqueous drilling fluid or a non-aqueous drilling fluid;
at least some of the compressible particles have a specific gravity that is 1.5 to 2.0 times that of the carrier fluid; and
the method further comprises blending the compressible particles into the carrier fluid at a surface to form the fluid mixture, before pumping the fluid mixture into the annulus.

18. The method of claim 17, further comprising:
determining a maximum pressure for effectiveness of the compressible particles;
and ensuring that during the pumping of the fluid mixture the compressible particles are not exposed to a hydrostatic pressure of fluids in the wellbore that exceeds the maximum pressure.

19. The method of claim 17, further comprising:
determining a range of pressures expected to be experienced by the fluid mixture in the annulus; and
designing the compressible particles to have an optimum pressure performance comprising a maximum reversible volumetric expansion/contraction percentage at an upper end of the range of expected pressures.

20. The method of claim 12, wherein each of the carbonaceous particles is coated with a polymeric rubber material.

21. A wellbore having a trapped annulus, comprising:
a first string of casing extending into a subsurface to a first depth;
a second string of casing extending into the subsurface to a depth that is greater than the first depth, and wherein the first string of casing surrounds an upper portion of the second string of casing forming an annular region;
a column of cement residing around the second string of casing below the first depth;
a wellhead placed over the wellbore, forming a trapped annulus in the wellbore over the annular region;
at least one barrier mechanism placed in series along the second string of casing to at least partially seal the annular region along the column of cement, wherein the at least one barrier mechanism comprises a plurality of cups spaced apart along the second string of casing, wherein the cups are concave;
a fluid mixture residing within the trapped annulus comprising:
a carrier fluid; and
a plurality of compressible, carbonaceous particles dispersed in the carrier fluid, wherein the carbonaceous particles are designed to absorb pressure in response to thermal expansion of wellbore fluids within the annular region during a production of hydrocarbon fluids from the wellbore, wherein at least some of the compressible particles have a density that is less than a density of the carrier fluid such that the compressible particles are biased to rise in the trapped annulus.

22. The wellbore of claim 21, wherein each of the plurality of compressible particles comprises calcined petroleum coke and sulfur.

23. The wellbore of claim 21, wherein each of the carbonaceous particles is coated with a polymeric rubber material.

24. The wellbore of claim 23, wherein the plurality of compressible particles together have a reversible volumetric expansion/contraction of within the range of 10 to 25% at pressures between 15 pounds per square inch (psi) and at least 10,000 psi.

* * * * *